US007330845B2

(12) United States Patent
Lee et al.

(10) Patent No.: US 7,330,845 B2
(45) Date of Patent: Feb. 12, 2008

(54) SYSTEM, METHOD AND PROGRAM PRODUCT FOR PROVIDING NAVIGATIONAL INFORMATION FOR FACILITATING NAVIGATION AND USER SOCIALIZATION AT WEB SITES

(75) Inventors: Alison Lee, New York, NY (US); Younghee Jung, Helsinki (FI); Peter Malkin, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 53 days.

(21) Appl. No.: 09/785,000

(22) Filed: Feb. 16, 2001

(65) Prior Publication Data

US 2001/0029506 A1 Oct. 11, 2001

Related U.S. Application Data

(60) Provisional application No. 60/183,182, filed on Feb. 17, 2000.

(51) Int. Cl.
*G06F 7/00* (2006.01)

(52) U.S. Cl. .................. 707/2; 707/10; 707/101; 707/102; 707/103 R

(58) Field of Classification Search ............ 707/2, 707/10, 101, 102, 103 R
See application file for complete search history.

(56) References Cited

U.S. PATENT DOCUMENTS 5,442,741 A * 8/1995 Hughes et al. ............ 345/442
6,029,172 A * 2/2000 Jorna et al. ................ 707/102
6,289,353 B1 * 9/2001 Hazlehurst et al. ......... 707/102
6,493,702 B1 * 12/2002 Adar et al. ................... 707/3
6,539,375 B2 * 3/2003 Kawasaki .................... 707/5

OTHER PUBLICATIONS

American Online, Inc., AOL.COM, copyright 1999, pp. 1-2, <http://web.archive.org/web/19990116232138/http://www.aol.com/index.html>.*
Yahoo! Inc., Yahoo, <http://web.archive.org/web/19991114233817/http://www.yahoo.com/index.html>, pp. 1-6.*
The Motley Fool, The Motley Fool: Finnace and Folly, http://web.archive.org/web/19990125085745/http://fool.com/, copyright 1996-1999.*
Minar et al., Visualizing the Crowds at a Web Site, 1999 < http://www.media.mit.edu/~nelson/researchcrowdvis, http://www.media.mit.edu/~nelson/research /crowdvis/WebVisApplet.html and http://www.media.mit.edu/~nelson/courses/social-visualization/dec3/>.*
Andrews et al., "Information Slices: Visualizing and Exploring Large Hierarchies using Cascading, Semi-Circular Discs", Oct. 1998, IEEE Symposium on Information Visualization, pp. 1-4.*

(Continued)

*Primary Examiner*—Hung Q Pham
(74) *Attorney, Agent, or Firm*—Brian P. Verminski

(57) ABSTRACT

User socialization with and social visualization of web sites is provided with a mapping data structure representing two or more categories. Each of the categories is divided into subcategories of ordered levels of specificity. Each of the ordered levels of specificity is also grouped into subcategories of the same levels of specificity.

26 Claims, 19 Drawing Sheets

OTHER PUBLICATIONS

A. Armstrong et al., "The Real Value of On-Line Communities", Harvard Business Review, May-Jun. 1996, pp. 134-141.

"2. Trees", Graph Theory with Applications, pp. 25-41.

J. C. Nortel and R. Kazman, "WebQuery: Searching and Visualizing the Web through Connectivity", http://www.scope.gmd.de/info, pp. 1-13.

E. H. Chi, et al., "Visualizing the Evolution of Web Ecologies," Apr. 18-23, 1998, pp. 400-407.

P. Curtis, "6. Mudding: Social Phenomena in Text-Based Virtual Realities", pp. 121-142.

S. Harrison, et al., "Re-Place-ing Space: The Roles of Place and Space in Collaborative Systems", 1996, pp. 67-76.

W.C. Hill, et al., "Edit Wear and Read Wear", May 3-7, 1992 ACM, pp. 3-9.

M.L. Huang, et al., "WebOFDAV—navigating and visualizing the Web on-line with animated context swapping," http://www7.scu.edu.au, pp. 1-6.

S.E. Lamm, et al., "Real-Time Geographic Visualization of World Wide Web Traffic", Fifth International World Wide Web Conference, May 6-10, 1996, Paris, France, pp. 1-14.

"III, The City Image and Its Elements", pp. 46-90.

Y.S. Maarek, et al., "WebCutter: A System for Dynamic and Tailorable Site Mapping," http://www.scope.gmd.de/info, pp. 1-13.

N. Minar, "Visualizing the Crowds at a Web Site," http://www.media.mit.edu/~nelson/research/crowdvis/, May 15-20, 1999 ACM, pp. 186-187.

Alan Munro, et al., "Chapter 1: Footprints in the Snow", Social Navigation of Information Space, pp. 1-14.

E.D. Mynatt, et al., "Design for Network Communities," Papers, CHI 97, Mar. 22-27, 1997, pp. 210-217.

J.E. Pitkow, et al., "WebViz: A Tool for WWW Access Log Analysis," 7 pages.

F.B. Viegas, et al., "Chat Circles", Papers, CHI 99, May 15-20, 1999, pp. 9-16.

R. Xiong, et al., "PeopleGarden: Creating Data Portaits for Users,"9 CHI Letters vol. 1, 1, pp. 38-44.

* cited by examiner

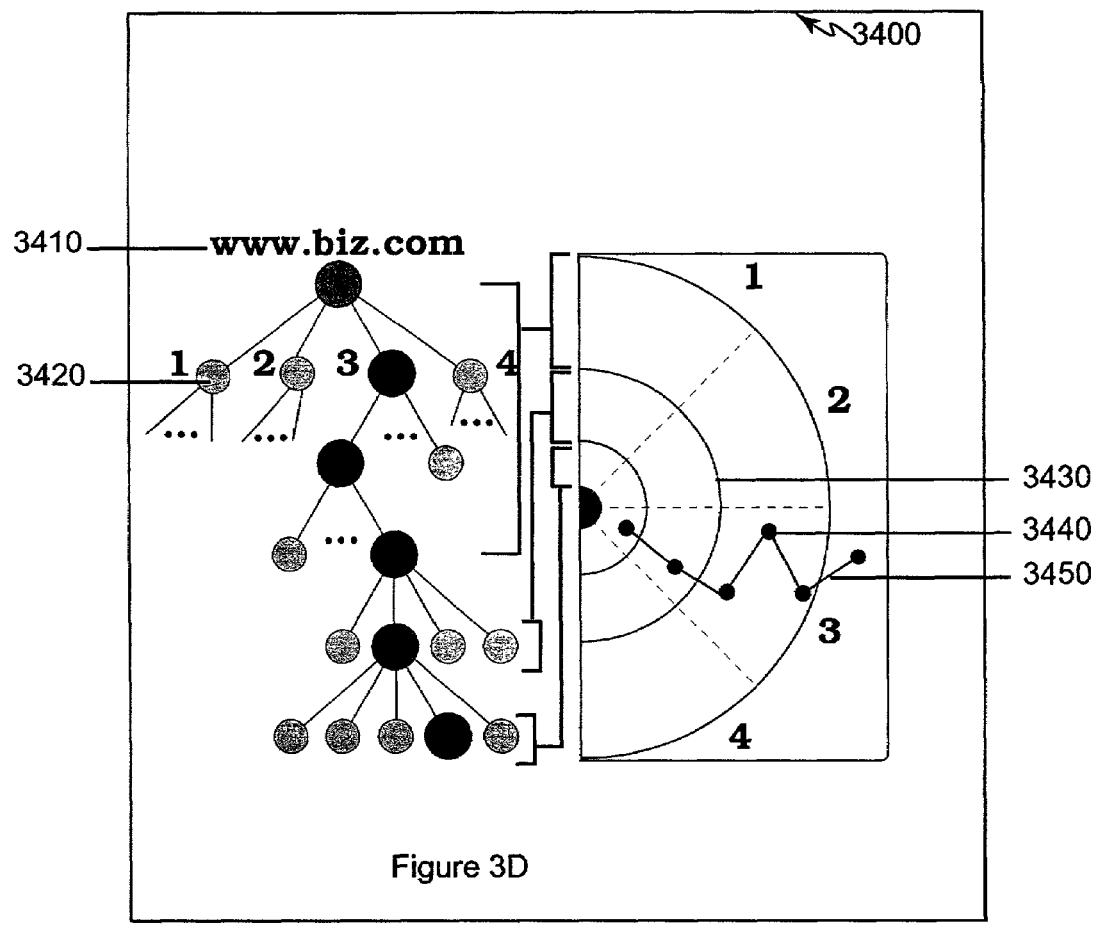
Figure 3 GUI Elements

Client Activity Logger    Figure 8

SYSTEM, METHOD AND PROGRAM PRODUCT FOR PROVIDING NAVIGATIONAL INFORMATION FOR FACILITATING NAVIGATION AND USER SOCIALIZATION AT WEB SITES

CROSS REFERENCES AND PRIORITY DOCUMENTS

This Application claims priority to U.S. Provisional patent application No. 60/183,182, entitled "Design of an Interaction Environment for an Electronic Marketplace Community" to Lee et al., filed on Feb. 17, 2000. This Application is herein incorporated by reference in its entirety.

FIELD OF THE INVENTION

This invention relates to interactions among participants at a Web site. More specifically, the invention is a system and method that enables participants at a Web site, with possibly common or complementary attributes and goals, to collaborate, communicate, coordinate, and socially navigate within the Web site.

BACKGROUND OF THE INVENTION

Online spaces like the Well, Usenet newsgroups, and MUDs (multi-user dungeons) have gained interest among researchers, educators and business people as objects of study, design, and commercial application. The research community has been particularly interested in the design and use of such systems to support groups of people collaborating. Much of their focus has been placed on understanding the interdependence of social and technical elements in a design space to successfully support online social groups. More recently, the World Wide Web has been drawn to online social groups as part of its evolution and growth. Much of this interest has been fueled by interests in capitalizing on them in new business paradigms.

These developments are bringing the Web to an important and new stage in its development. While the first two stages can be characterized as valuing the importance of information and transactions, respectively, the third stage can be characterized as valuing the role that people play on the Web. Yet, much of the commercial efforts to enhance the participation and interactions of people, in particular, to create online social groups at Web sites, have taken a tools focus (e.g., chat tools, bulletin boards, and instant messaging) rather than the broader socio-technical focus that has led to successes in formation of social groups for the Internet and for some e-commerce sites (e.g., Motley Fool and eBay).

PROBLEMS WITH THE PRIOR ART

Current Internet/Web/e-commerce sites contain site maps that resemble store directories (e.g., eBay's site map). These directories present text categories and subcategories of products and services available at the site. Their main purpose is informational; providing users with insights into the specific categories and sub categories used to organize the products and services within the Web site. While users have a pointer for where the information in this structure (i.e., categories, sub categories, listings, and products and services) is located in the Web site, this reference is an abstract one. There are no spatial cues in the textual store directory representation that enable users to exploit them, like in the physical world, to guide them in their search of related and unrelated products and services. The addition of spatial cues is useful to users for formulating a mental map of a space and for using this mental structure to perform their tasks (e.g., to access a product through a store directory or by location). The prior art does not provide a site map with one-to-one mapping between a semantic organization and a spatial organization.

While the particular content (i.e., products and services) in the textual store directory representation is unique to a Web site, the organizational structure of categories, sub categories, listings, and products and services are similar across Web sites. This common organizational structure is not made explicit to users to allow them to ground or relate their navigation of the products and services with their navigation of the Web store site. The prior art neither makes the organizational structure explicit in Web site maps, nor makes the common representational grammar, e.g. a visual grammar, available so that it can be shared across Web sites.

The prior art has developed 2D and 3D graphical visualizations to map the structure of the Web and Web sites. They are used to visualize search results, to aid user navigation, to illustrate access patterns or to aid site management. These tools are intended for exploration and analysis purposes by either end-users or Web administrators in which the detailed representation of the structure is important for the task. However, for the Web-based collaborative setting, the focus is supporting multi-user interactions and providing sufficient information about the Web site structure to facilitate such interactions. This domain requires a sharable representation related to the context and purpose of the site that provide the common ground for promoting collaborative interactions.

Many collaborative systems like MUDs/MOOs, virtual worlds; and avatar systems have exploited the role of space and spatial organization to facilitate, structure, and guide social interaction. More importantly, the spatial models provide a means to frame social information about people, activities, and interaction within the semantic context of the site. These collaborative systems have developed visual representations that mirror concepts from the physical world (e.g., rooms). Aside from the problem that they do not scale effectively to large numbers of people, these representations do not encode the inter-relationships between spaces other than through labelling (e.g., living room, office, Sarah's room). Therefore, the prior art neither provides a visual representation that includes a one-to-one mapping between a semantic organization and a spatial organization nor a simplified representation that goes beyond information browsing to support social interactions.

Current Web sites are very subjective spaces. These sites rarely, if ever, facilitate the creation of a common mental model among the site users. For example, it is difficult for users of the prior art to feel they are in different sub locations in a common (physical or cognitive) space. While different users can be found in the same eStore, the prior arts neither indicate which of the different departments of the store (e.g. sporting goods, clothes, housewares) these users are found nor enable the users to be aware of this information. Essentially, the prior art does not provide a shared cognitive space that has sub locations.

While a number of Web applications provide capabilities to visualize every person that is at the Web site or a Web page, this representation does not scale effectively to large numbers of people that can be at a Web site. These applications are not provided by the Web site but by another business (third party) which require users to use the business' proprietary application. As a result, these applications do not capture all the users at a Web site, but only those users using the third party application. Examples of third party applications include: "Gooey" and "Odigo". Essentially, users of "Gooey" at eBay are unaware of users of "Odigo" at eBay.

Furthermore, the prior art has neither an improved visualization for allowing users to be aware of other people's activities and social interactions (i.e., social visualization) nor a spatial representation that encodes such information to support social navigation. Social navigation is "navigation guided by other people and/or the present or past actions of other people" like "navigation towards/away from a crowd." While the textual store directory provides an appropriate metaphor for information navigation, it is an inappropriate metaphor for supporting social navigation. As a result, users neither develop a mental model of the Web site nor have access to a spatial representation as a basis for shared cognition or shared action (e.g., social navigation) among users. For example, a user cannot easily drop in on a discussion that a crowd of people at the site are having about a product and then make a decision whether or not to approach and join in the discussion.

Current Web sites are not selective in terms of which people, that are present at the Web site, are shown to any given user. Furthermore, while current Web sites enable users to become aware of information and activities of other people who share a common interest with the user (e.g., Amazon.com—people like you have bought this book) through interests identified by the user or by inference from user's actions, they are unable to support the user in the serendipitous discovery of common or complementary interests arising from social interactions with other people. The prior art has no means of visualizing information about people, activities and social interactions at a Web site that permits users to determine common or complementary interests among a group of users.

Since current Web sites lack visualizations of the social context (i.e., activities and social interactions of other people), users have very limited awareness and understanding of their social context. As a result, current Web sites can only support formal, planned or superficial interactions while informal, unplanned, meaningful, spontaneous or serendipitous interactions remain unsupported. Research has shown that these other kinds of interactions are important parts of the repertoire of social interactions. Also, research has shown that repeated social interactions can lead to the formation of social groups and possibly the establishment of relationships. While current Web sites provide users with the tools to interact with each other (e.g., public and private chat, message boards, and instant messaging), they fail to provide users with an interaction environment that links these tools with the context for social interactions. As a result, the possibilities for social interactions to occur are limited, the opportunities to discover other people who potentially share common or complementary interests are never pursued, and the benefits that can be derived from such interactions are never realized.

Current Web sites are very concerned with the problem of how to encourage many people to visit their sites, to encourage repeat as well as often visits to their sites, and to encourage people to remain at their Web site for a long period of time. A critical mass of people is important for the survival and livelihood of the Web site. Furthermore, research has shown that people are sociable beings. They are drawn to where other people are and are interested in engaging others in social interactions to benefit from each other's company. Hence, current Web sites are interested in ways to attract and retain people. While the prior art provides users with means for social interactions, it lacks improved mechanisms for catalyzing social interactions that would lead to frequent and repeated visits to the Web site for such interactions.

Current Web sites are focused on making information available to users to facilitate the user's decision making with regards to transactions. This problem of how to turn a user who is a looker into a booker (i.e., purchaser) is an important one for business. In so far as a business can help the user to reach a decision by bringing the relevant information to bear for the user, the greater the value is the mechanism for promoting sales and transactions for the business. The prior art has used social filtering technology to solve part of this problem and would benefit from having additional data for its social filtering technology. Access to this additional data can be gotten from encouraging additional formation of social groups. Furthermore, the prior art can benefit from improved means of using social interactions as a means of bringing relevant information to bear in a user s decision-making.

OBJECTS OF THE INVENTION

An object of this invention is an improved system and method for social visualization on one or more Web sites.

An object of this invention is an improved system and method for social visualization on one or more Web sites to create a mental model of the Web site to facilitate social navigation.

An object of this invention is an improved system and method for creating a visual map of a Web site that provides accurate information about the people, activities and social interactions occurring at the Web site.

An object of this invention is an improved system and method for social visualization on a Web site that does not rely on third party applications.

An object of this invention is an improved system and method for social visualization that permits determining common as well as complementary interests among a plurality of users having more than one interest and to provide an environment that permits users (a) to be aware of other people, their activities and social interactions and (b) to explore and learn about other people's activities and social interactions to determine common or complementary interests.

An object of this invention is an improved system and method for social visualization that permits determining common as well as complementary interests among a plurality of users having more than one interest and promote various interactions among the users.

An object of this invention is an improved system and method for social visualization that permits determining common as well as complementary interests among a plurality of users having more than one interest that benefits the business purposes of a Web site.

An object of this invention is an improved system and method for social visualization that encourages repeated and frequent social interactions among users of a commercial Web site.

An object of this invention is an improved system and method for social visualization that permits determining common as well as complementary interests among a plurality of users having more than one interest that promotes sales and/or transactions at an e-commerce Web site.

SUMMARY OF THE INVENTION

This invention is a computer system, method, and program product for improving user socialization with and social visualization of Web sites. The system has a mapping data structure representing two or more categories. Each of the categories is divided into subcategories of ordered levels of specificity. Each of the ordered levels of specificity is also grouped into subcategories of the same levels of specificity. Closeness of items in two or more different categories and levels of specificity is captured by the way data is stored and organized in the mapping data structure.

BRIEF DESCRIPTION OF THE FIGURES

The foregoing and other objects, aspects, and advantages will be better understood from the following non limiting detailed description of preferred embodiments of the invention with reference to the drawings that include the following:

FIG. 3, comprising FIGS. 3A, 3B, 3C, and 3D, is a diagram of various graphic user interface (GUI) elements. FIG. 3D shows mapping of internal eStore catalog (represented as a tree) to external representation.

DETAILED DESCRIPTION OF THE INVENTION

This invention is a computer system, method, and program product for collecting, tracking and mapping social information at a Web site to facilitate user socialization with and social visualization at the Web site. The present invention consists of a mapping data structure representing two or more categories. Each of the categories is divided into subcategories of ordered levels of specificity. Each of the ordered levels of specificity is also grouped into subcategories of the same levels of specificity. Closeness of items in two or more different categories and levels of specificity is captured by the way data is stored and organized in the mapping data structure. This mapping data structure overlays information about people, activities, and social interactions at a Web site onto the same internal representation that exposes the semantic structure of the contents of the Web site. By grounding the social information within the same representation used to express the purpose and function of the Web site, the mapping data structure provides a context for interpreting a person's location and activities. The present invention also incorporates mechanisms that enable participants to engage in social interactions with other participants. The present invention has applications for the Web as well as the Internet and other online interaction systems.

FIGS. 1, 2, and 4-12 described below refer to the present system and method invention. Other Figures and descriptions refer to the over graphical user interfaces (GUI), invention uses, and business methods that are more particularly described and claimed in U.S. patent application Ser. No. 09/784,913, now U.S. Pat. No. 6,961,910, entitled SYSTEM FOR INTERACTING WITH PARTICIPANTS AT A WEB SITE THROUGH AN INTERACTIVE VISUAL PROXY to Lee et al., which are herein incorporated by reference in their entirety.

Figure 1:
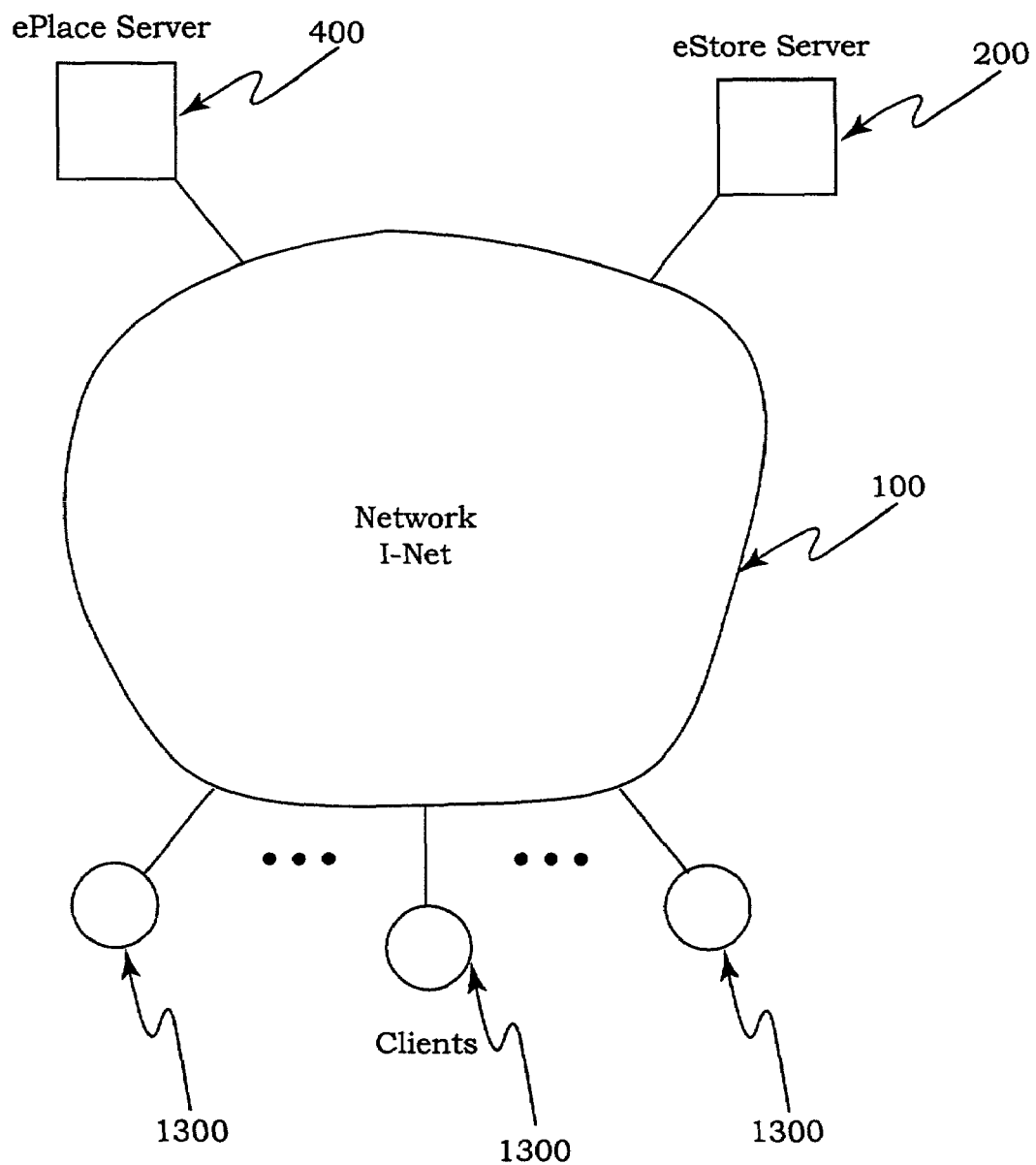
FIG. 1 is a block diagram of one preferred system architecture.

FIG. 1 depicts an overall logical network topology within which the preferred embodiment of the current invention can be implemented. This topology includes a network (100), through which clients (1300) and servers (400 and 200) communicate. This network includes, but is not limited to the Internet (both wired and wireless). The servers include an ePlace Server (400) (described in detail with reference to FIG. 4), and an eStore Server (200) which provides the data about a given store or company. These two servers (200, 400) can be any network (100) accessible data source and computing node, including, but not limited to an HTTP (web) server (such as that sold by IBM under the trademark WebSphere), or SQL database (such as that sold by IBM under the trademark DB2). They are able to retrieve and transmit data, to process received data, and to provide transactions. They run on machines such as the RS/6000, S390, or PowerPC sold by IBM. A given client (1300) can be any computing node able to transmit data over the network (100), to process received data, and then to provide a graphic rendering of the processed data. Such devices include personal computers, such as IBM's ThinkPad; a personal data assistant (PDA), such as IBM's WorkPad, or a network-communication-enabled cellular phone, such as the Nokia 9000. Although only three clients (1300) are explicitly shown in FIG. 1, the present invention is applicable to any number of clients.

Figure 2:
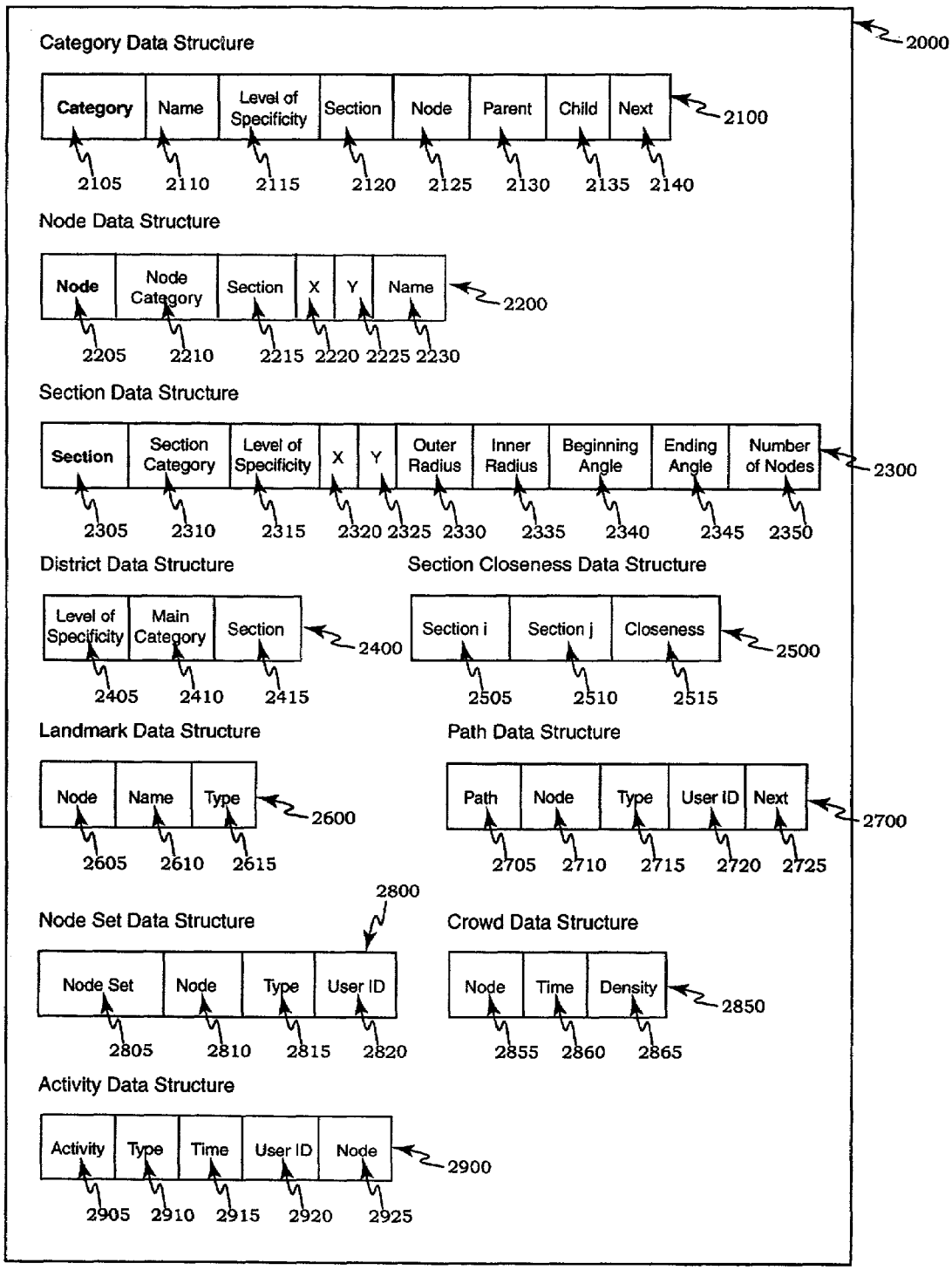
FIG. 2 is a block diagram of a mapping data structure.

FIG. 2 depicts an example of the Mapping Data Structure (2000) used by the preferred implementation of the current invention to hold, access, and modify its data. Those with regular skill in the art will appreciate that this data structure can be implemented many different ways, including, but not limited to a set of relational tables held and accessed through a relational database like DB2 sold by IBM, or as a set of objects accessed via a program written in an object-oriented language like Java. As shown, there are 10 different types of structures, each specifying a particular type relation.

The Category Data Structure (2100) describes the internal organization of the eStore's (200) data content. As shown, each instance of this structure describes a data point's location in the internal structure. It includes the following identifiers (i.e., named components): its internal identifier (2105) (e.g., "2345" a unique category identifier), its internal name (2110) (e.g., "superball"), its level of specificity (2115) (e.g., 3), its section (2120) (e.g., "22" a unique section identifier), its node (2125) (e.g., "123abc" a unique data node identifier), its parent (2130) (e.g., the identifier of the given category's parent), its child (2135) (e.g., the identifier of its child), and next (2140) (e.g., the identifier of the given category's next sibling).

The Node Data Structure (2200) describes the data structure for the node component (3210, 3230) of the external visual representations (3100, 3200, 3300, described in detail with reference to FIGS. 3A, 3B, and 3C respectively). As shown, each instance of this data structure describes the location of an eStore's data point in the visual representation. It includes the following identifiers: its node id (2205) (e.g., "123abc" a unique data node identifier), its category identifier (2210) (e.g., "2345" a unique category identifier), its section (2215) (e.g., "22" a unique section identifier), its x and y coordinate (2220, 2225) within the section (e.g., "10", "20") and its external name (2230) (e.g., "superball toys").

The Section Data Structure (2300) describes the data structure for the section component (3170) of the external visual representation (3100). Sections are embedded in a district (3180). As shown, each instance of this data structure describes the spatial layout and location of a section. It includes the following identifiers: its section (2305) (e.g., "22" a unique section identifier), the principal category data point's identifier (2310) for the section (e.g., "2345" a unique category identifier), its level of specificity (2315) (e.g., 3), its origin expressed in terms of a pair of x and y coordinates (2320, 2325) within a district (e.g., "125", "120"), its spatial extent expressed in terms of outer radius (2330) (e.g., "10"), inner radius, (2335) (e.g., "5"), its beginning angle (2340) (e.g., "110" degrees), and its ending angle (2345) (e.g., "120" degrees), and the number of nodes (2350) located within it.

The District Data Structure (2400) describes the data structure for the district component (3180) of the external visual representation (3100). As shown, each instance of this data structure describes a section contained in the district. It includes the following identifiers: the level of specificity (2405) (e.g., 3), main category for the section (2410) (e.g., "2345" a unique category identifier) and the section (2415) (e.g., "22" a unique section identifier).

The Section Closeness Data Structure (2500) describes the closeness between two sections. As shown, each instance of this data structure includes the following identifiers: the first and second section identifiers (2505, 2510) (e.g., "22" and "35") and the closeness value (2515) (e.g., "33").

The Landmark Data Structure (2600) describes the data structure for the landmark component (3105, 3110, 3120, 3130, 3150) of the external visual representation (3100). As shown, each instance of this data structure includes the following identifiers: the node (2605) (e.g., "458ytr" a unique node identifier), its name (2610) (e.g., "Mary") and its type (2615) (e.g., "customer service agents").

The Path Data Structure (2700) describes the data structure for the path component (3220) of the external visual representation (3200). As shown, each instance of this data structure describes a set of connected nodes. It includes the following identifiers: the path (2705) (e.g., "7341" a unique path identifier), a node in the path (2710) (e.g., "743opi" a unique node identifier), path's type (2715) (e.g., "popular route"), a user ID (2720) (e.g., "first-time visitors"), and the next node in the path (2725) (e.g., the identifier of the given path's next sibling).

The Node Set Data Structure (2800) describes the data structure for the node-set component (3310) of the external visual representation (3300). As shown, instances of this data structure describe a set of related nodes. They include the following identifiers: the node set (2805) (e.g., "5431" a unique node-set identifier), a node in the node set (2810) (e.g., "982owe" a unique node identifier), node-set's type (2815) (e.g., "bought similar items"), and a user ID (2820) (e.g., "science fiction").

The Crowd Data Structure (2850) describes the data structure for the crowd component (3190) of the external visual representation (3100). As shown, each instance of this data structure describes the crowd size at a given node. It includes the following identifiers: the node (2855) (e.g., "743opi" a unique node identifier), the time (2860) ("12:45"), and the density (2865) of the crowd (e.g., "876 customers per node").

The Activity Data Structure (2900) describes the data structure for selected activities occurring at the ePlace Server (400) and the eStore Server (200). These are also known as transient landmarks (3120, 3130, 3150) and are further differentiated as either as a business landmark (3150) or a landmark of personal interest to the user (3120, 3130). As shown, each instance of this data structure describes an activity occurring at a given node. It includes the following identifiers: the activity (2905) (e.g., "a187" a unique activity identifier), the activity type (2910) (e.g., "public chat"), the time (2915) ("13:15"), a user ID (2920) (e.g., "John"), and the node (2925) (e.g., "874iyt" a unique node identifier).

FIGS. 6 thru 11 describe how these data structures are instantiated. Beyond these descriptions, there are two comments to be made about how the Path Data Structure can be additionally populated and how the Node Set Data Structure is populated. In addition to the way the Path Data Structure (2700) is populated (described in detail with reference to FIG. 7), it can be populated based on aggregation and analyses of the personal history path (e.g., common paths taken by particular user groups such as newcomers) or through user queries (e.g., paths taken by users who are regulars and are interested in "science fiction"). The Node Set Data Structure (2800) is created either through aggregation and analyses of the Web pages viewed by users (e.g., Web pages viewed by all members of a particular user groups such as newcomers) or through user queries (e.g., Web pages viewed by all regulars who are interested in "science fiction" or reputable sellers of all portables with 96 M of memory). Those with regular skill in the art will appreciate that database queries and statistical analyses can be used to provide the aggregation and analyses functions used to populate some of the instances of the Path Data Structure and the Node Set Data Structure.

Figures 3, 3A, 3B, 3C:
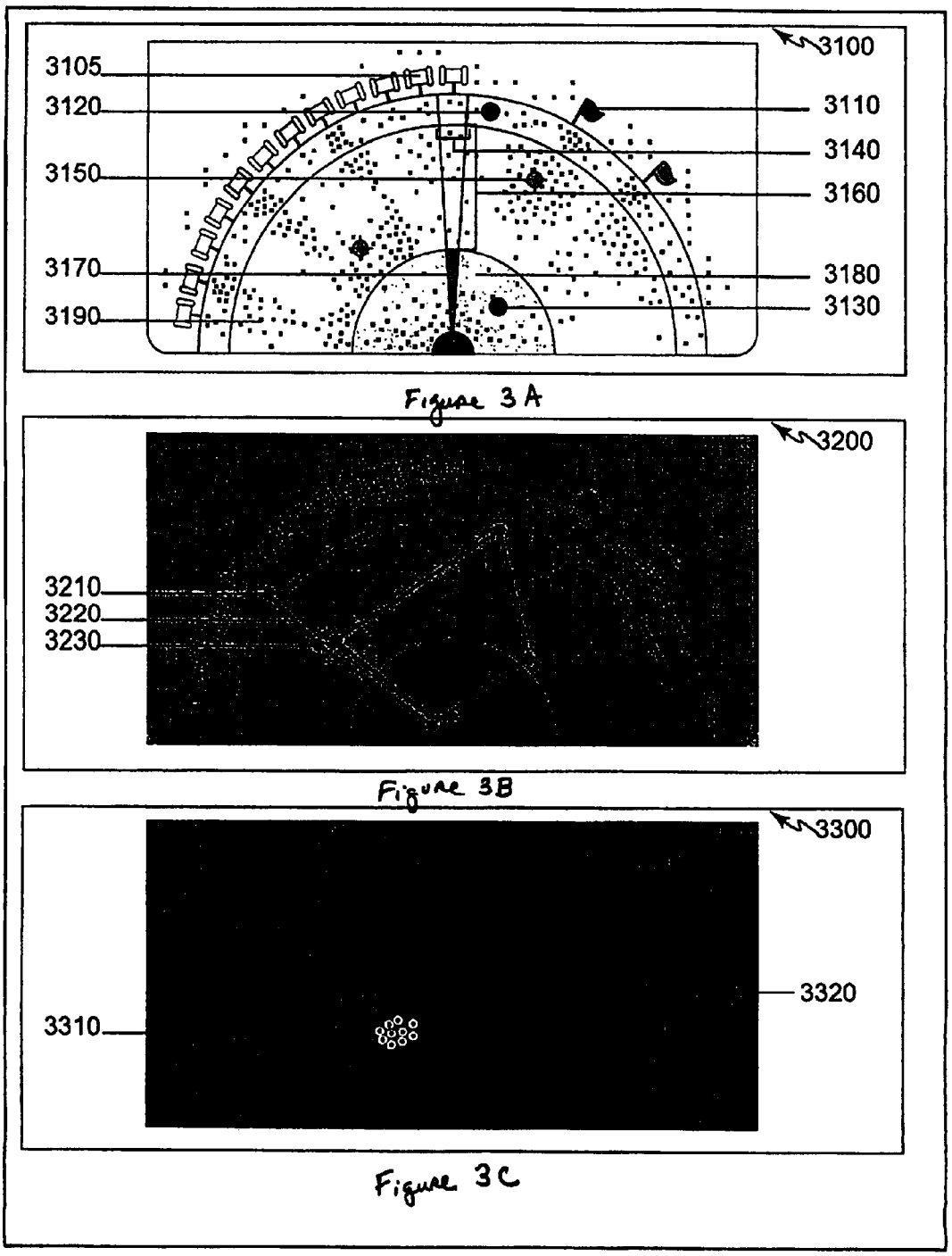

FIG. 3 contains three variants of the external visual representation (3100, 3200, 3300) highlighting various visual components used by the preferred implementation of the current invention to visualize the eStore's data content, the activities occurring at the ePlace Server (400) and the eStore Server (200), and the people present at the eStore. Those with regular skill in the art will appreciate that the representations and components can be visualized using one of many different geometric shapes and iconic representations, including, but not limited to a 2-dimensional shape such as a semi-circle drawn using a graphics package like Java 2D, or by a program written in an object-oriented language like Java. Visual representations 3100, 3200, 3300 contain visual examples of landmarks and activities (3105, 3110, 3120, 3130, 3150), a category (3140), a level of specificity (3160), a section (3170), a district (3180), a crowd (3190), nodes (3210, 3230), a path (3220), a node set (3310) and layer tab (3320). Although only a few examples of the components are explicitly shown in FIG. 3, the present visual representation can display any number of these components.

FIG. 3 also contains an example illustration (3400) of how the internal catalog structure (3410) (represented as a tree) is mapped to the external visual site-map representation. Each major branch of the tree is a main category (3420) and elements of the tree are mapped to particular levels of specificity (3430). Each node of the tree is a category and maps to a node in the external representation (3440) and a user's traversal from node to node is indicated by path (3450). The site-map maps the hierarchical structure of a Web site onto a semi-circle, with each major category mapped to a pie segment. The sub-rings represent levels of specificity and pie segments represent principal categories in a tree hierarchy (3400). This tree hierarchy is the internal representation of the eStore's data content. All Web pages in the leaf nodes of the hierarchy are mapped to the inner-most ring representing the third level of specificity. The parent of the leaf nodes are mapped into the middle ring; the second level of specificity. All non-leaf nodes that are not parents of a leaf node are mapped into the outer-most ring; the first level of specificity. Those with regular skill in the art will appreciate that an alternative mapping of the level of specificity to a ring is possible; one that maps leaf nodes onto the outer-most ring and the non-parents of leaf nodes onto the inner-most ring. This example shows one embodiment which uses three levels of specificity and pie segments as visual categories but the present invention is not restricted in the numbers of level of specificity or shapes for visual categories.

Figure 4:
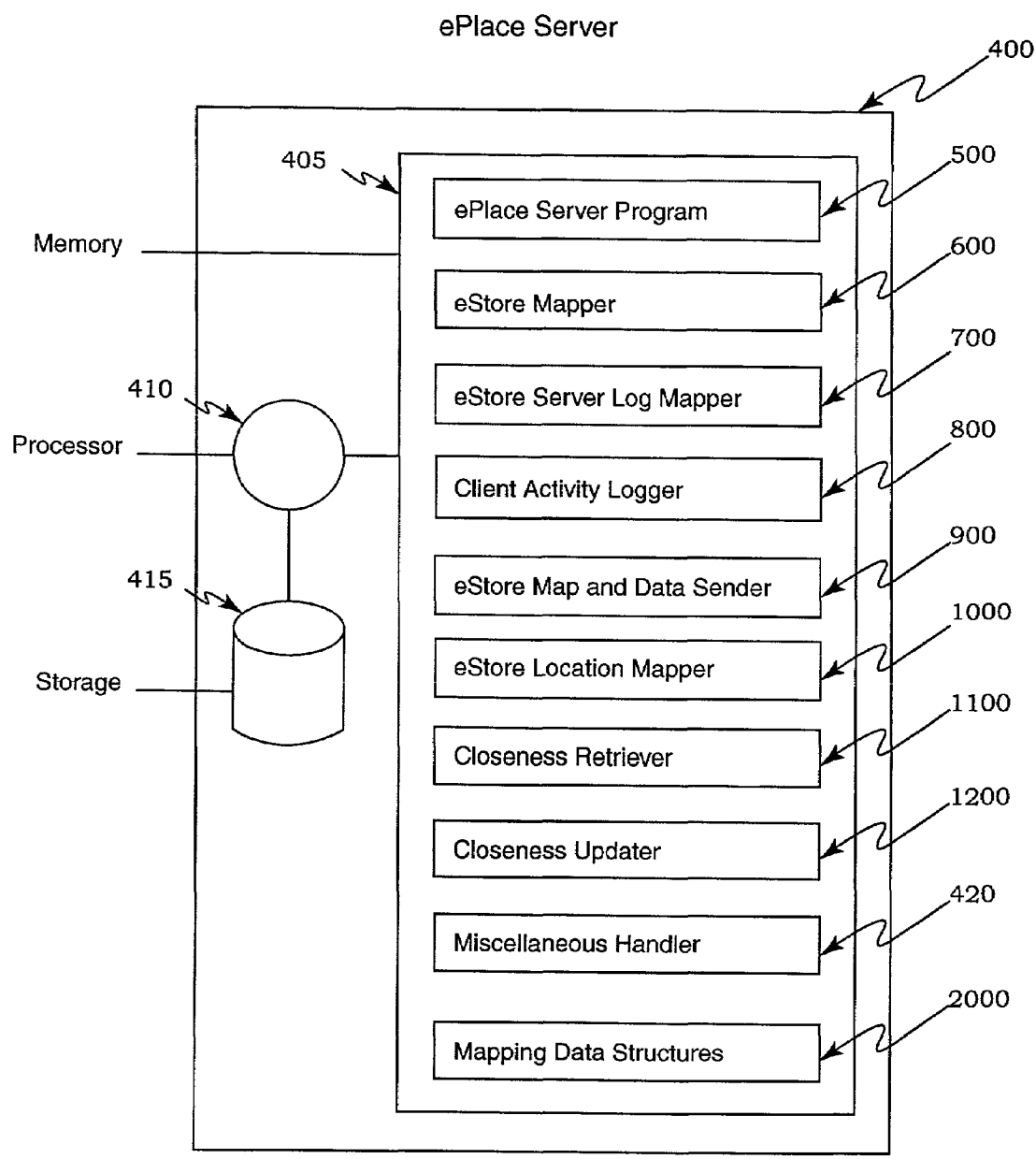
FIG. 4 is a block diagram of a server architecture.

FIG. 4 shows a block diagram of the major components of the ePlace Server (400), that aggregates, calculates and accesses dynamically updated data provided by the current invention. The ePlace Server (400) preferably includes a Processor (410), memory (405) such as RAM, and a storage device (415) such as a disk or CD-ROM. According to an embodiment of the present invention, the ePlace Server Program (500) (described in detail with reference to FIG. 5) is used to operate the server and is preferably embodied as computer executable code that is loaded remotely over the network (100), or locally from storage (415) into memory (405) for execution by Processor (410). The memory (405) preferably includes the ePlace Server Program (500), the eStore Mapper (600), the eStore Server Log Mapper (700) (described in detail with reference to FIG. 7), the Client Activity Logger (800) (described in detail with reference to FIG. 8), the eStore Map and Data Sender (900) (described in detail with reference to FIG. 9), the eStore Location Mapper (1000) (described in detail with reference to FIG. 10), the Closeness Retriever (1100) (described in detail with reference to FIG. 11), the Closeness Updater (1200), the Miscellaneous Handler (420, not described since it is beyond the scope of the current invention), and the Mapping Data Structures (2000) (described in detail with reference to FIG. 2).

Figure 5:
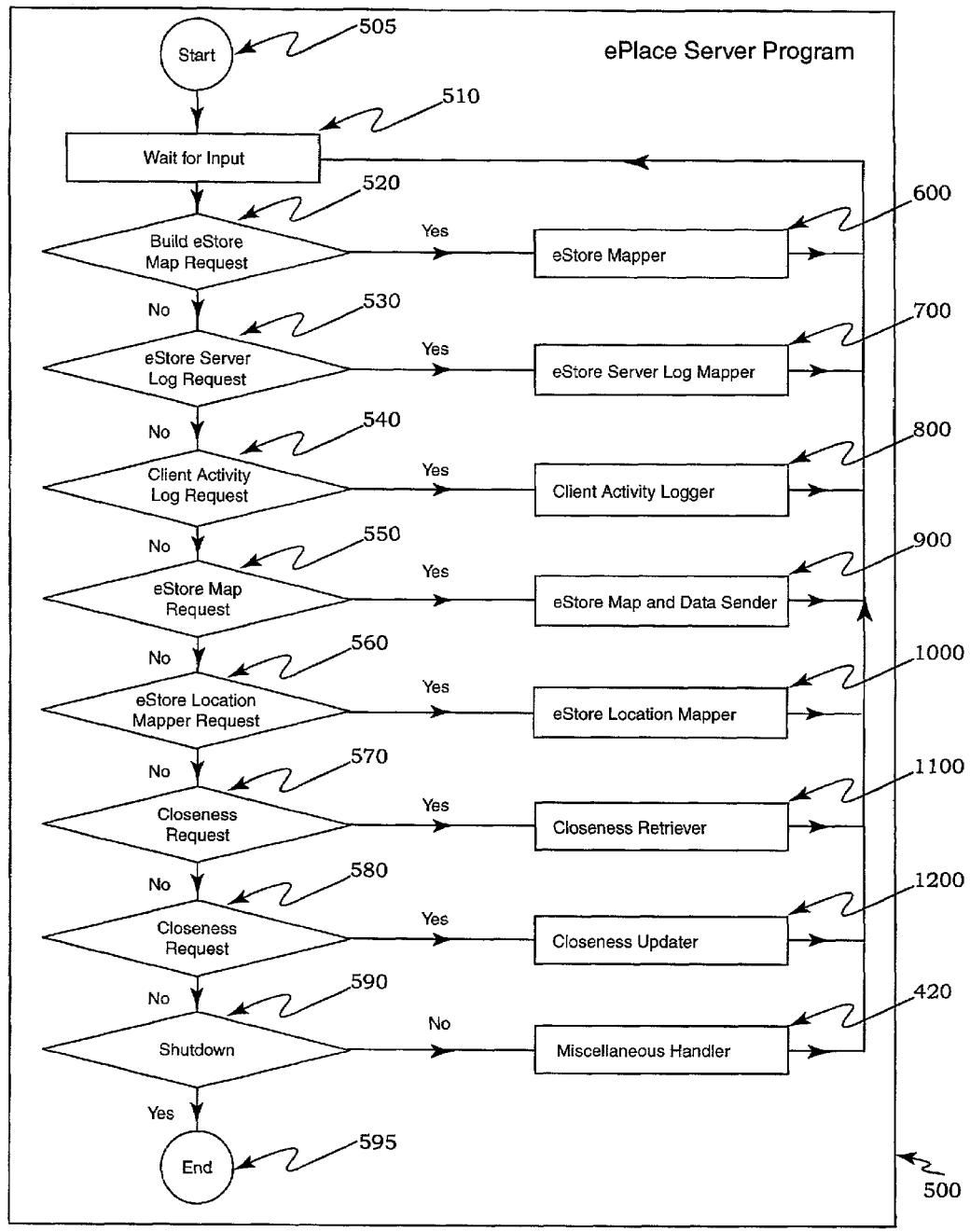
FIG. 5 is a flow chart of a server process for updating changes from one or more clients and sending changes to one or more clients.

FIG. 5 shows a block diagram of the program logic and flow of the ePlace Server (400) invoking each of the program elements resident in memory (405). The ePlace Sever (400) waits for input (510) from other ePlace Server processes, the eStore Server (200) or Clients (1300), and then processes each such request with the appropriate program element. These program elements include: the eStore Mapper (600), the eStore Server Log Mapper (700) (described in detail with reference to FIG. 7), the Client Activity Logger (800) (described in detail with reference to FIG. 8), the eStore Map and Data Sender (900) (described in detail with reference to FIG. 9), the eStore Location Mapper (1000) (described in detail with reference to FIG. 10), the Closeness Retriever (1100) (described in detail with reference to FIG. 11), the Closeness Updater (1200), the Miscellaneous Handler (420, not described since it is beyond the scope of the current invention), and the Mapping Data Structures (2000) (described in detail with reference to FIG. 2).

Figure 6:
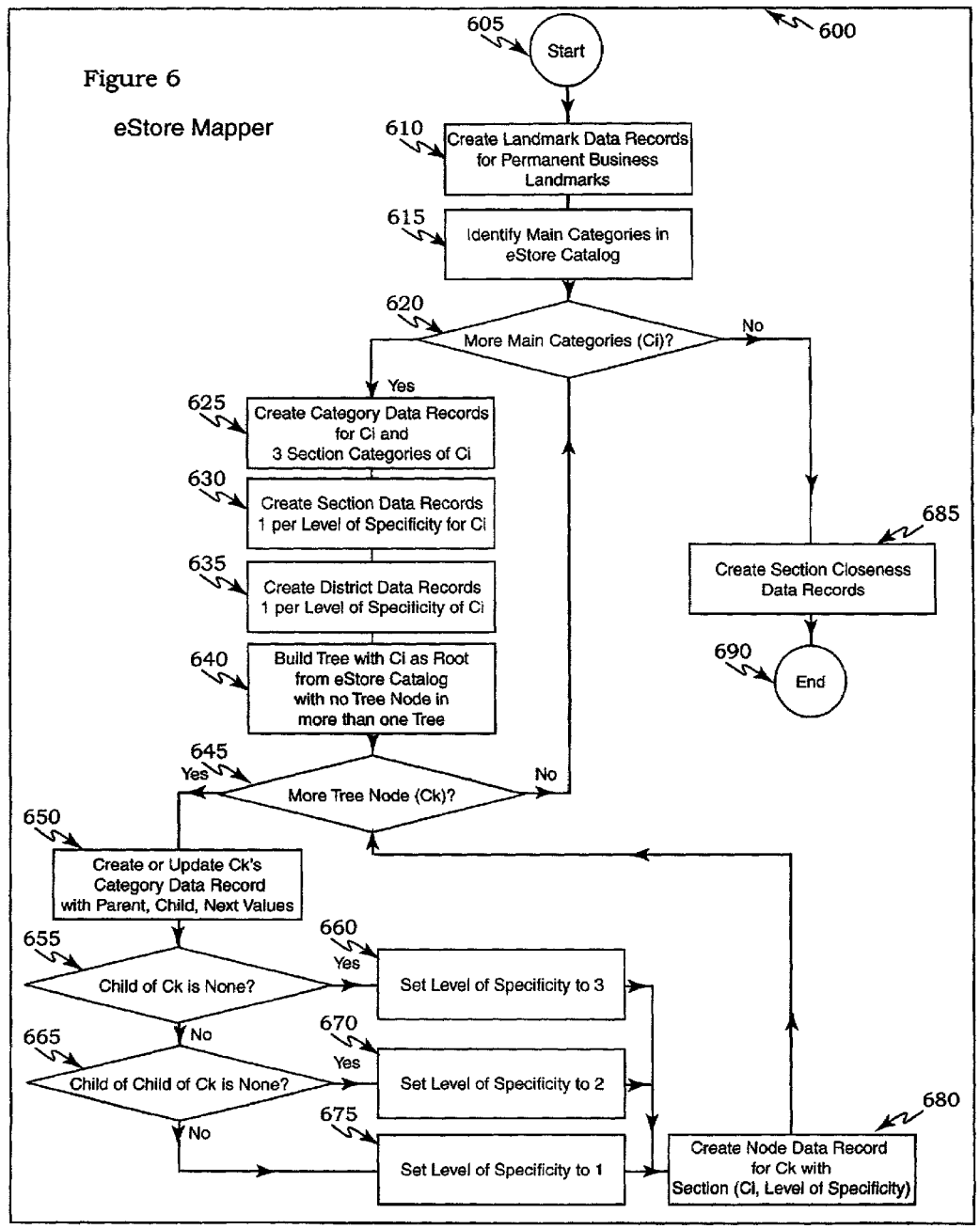
FIG. 6 is a flow chart of an eStore mapper process.

FIG. 6 illustrates how a request to build the eStore Map (520) is handled by the eStore Mapper (600). This request creates the instances of the data records for the Category Data Structure (2100), Node Data Structure (2200), Section Data Structure (2300), District Data Structure (2400), Section Closeness Data Structure (2500) and the Landmark Data Structure (2600). This process begins by creating the instances of Landmark Data Records (2600) for the Permanent Business Landmarks (620) based on the design specification for the particular eStore. This design specification is created by the eStore designers who determine the main categories, the layout and size of the GUI elements for categories, districts, sections, and permanent business landmarks (e.g., FIG. 3A). Given the main categories (615) from the design, each category is handled in turn (620) to create an instance of Category Data Record (625), to create instances of the Section Closeness Data Records (630) and District Data Records (635); one for each Level of Specificity. As well, a hierarchical tree (640) is built from the eStore Catalog rooted at the main category with every tree node being found in only one main category tree. The eStore Catalog structure is encoded in a database, such as that sold by IBM under the trademark of Websphere Commerce Suite. Those with regular skill in the art will appreciate that such a spanning tree rooted at the main category may be constructed out of a network structure by pruning cycles and duplicates. [See *Graph Theory with Applications,* Chapter 2 entitled "Trees", by Bondy and Murty 1976]. For each tree node in the main category tree (645), an instance of the Category Data Record (625) is created or updated with repect to its parent, child, and next values (650). Then, its level of specificity is determined through the following process. If there are no child for the tree node (655), then its level of specificity is set to 3 (660). Otherwise, if the child of the child for the tree node (665), then its level of specificity is set to 2 (670). Otherwise, the tree node's level of specificity is set to 1. An instance of the Node Data Record for the tree node is created using the Section identifier corresponding to the main category and the tree node's level of specificity (680). The (x, y) coordinate for the node in the Section is obtained either directly from the design or computed by some heuristic (e.g., hashing function based on attribute of the tree node's category information). When all the tree nodes of the main category tree is processed (645), the next main category is handled (620). When all the main categories are processed, then for each section, a Section Closeness Data Record is created (685) based on a measure of closeness between each section and every other section. Those with regular skill in the art will appreciate that a variety of metrics may be used to relate the closeness of items in one section with items in another section. In particular, measures based on physical closeness of section items as found in a physical store, semantic closeness of section items based on descriptions of section items, temporal closeness of section items based on patterns of access between items in two sections, and behavioral closeness of two items in different sections for one or more individuals based on purchase behaviors (e.g., people like you who bought videos bought books). Another example is to use the semantic distance (measuring the similarity of the descriptions of the catalog items) between the two clusters each containing the catalog items found in the two sections.

A third example is to use the probability that people viewing a catalog item in the first section will then view a catalog item in the second section. This probability can be based on the history of groups of people's movement from one section to another section.

Figure 7:
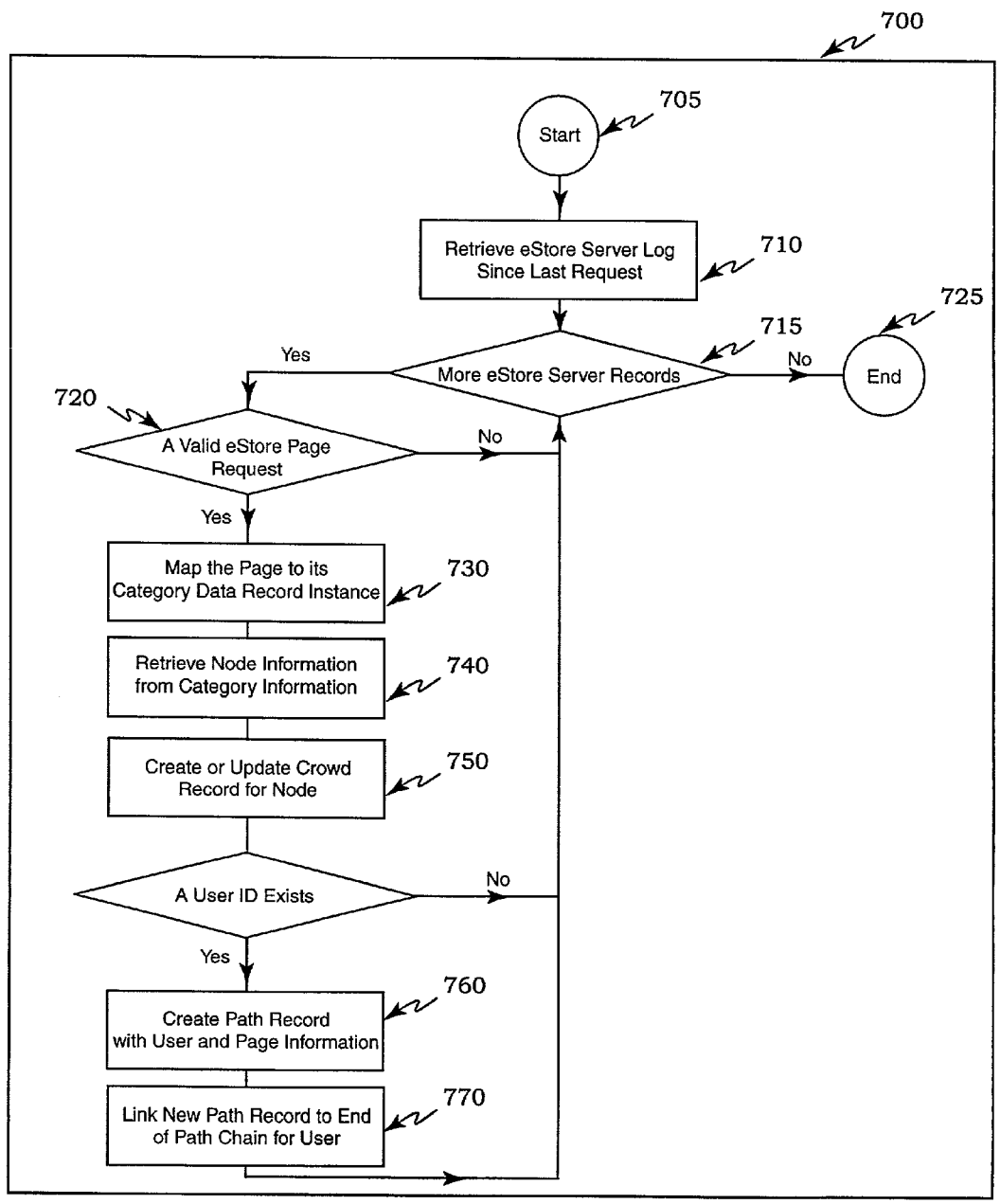
FIG. 7 is a flow chart of a eStore server log mapper process.

FIG. 7 illustrates how a request to process the eStore Server Log into constituent elements (530) is handled by the eStore Server Log Mapper (700). This process creates and/or updates instances of the Crowd Data Structure (2850), and possibly a new instance of the Path Data Structure (2700). Each access to an eStore Web page is logged by the eStore Server (such as is the case with IBM's WebSphere HTTP server) and the entries are retrieved by the ePlace Server (710). Each entry in the log is processed in turn (715). For every record that represents a valid page request (720), its instance in the Category Data Structure is retrieved based on the page information obtained from the log record (730). The Node identifier is extracted from the Category Data Record instance (740). The instance for the Crowd Data Structure (2850) with the particular Node identifier is updated or created (750) by incrementing or initializing the density field. If a user identifier is included in the log information, then the process creates (760) an instance of the Path Data Structure (2700) with the given user identifier and page information and links (770) this new instance to the end of the Path chain for the user.

Figure 8:
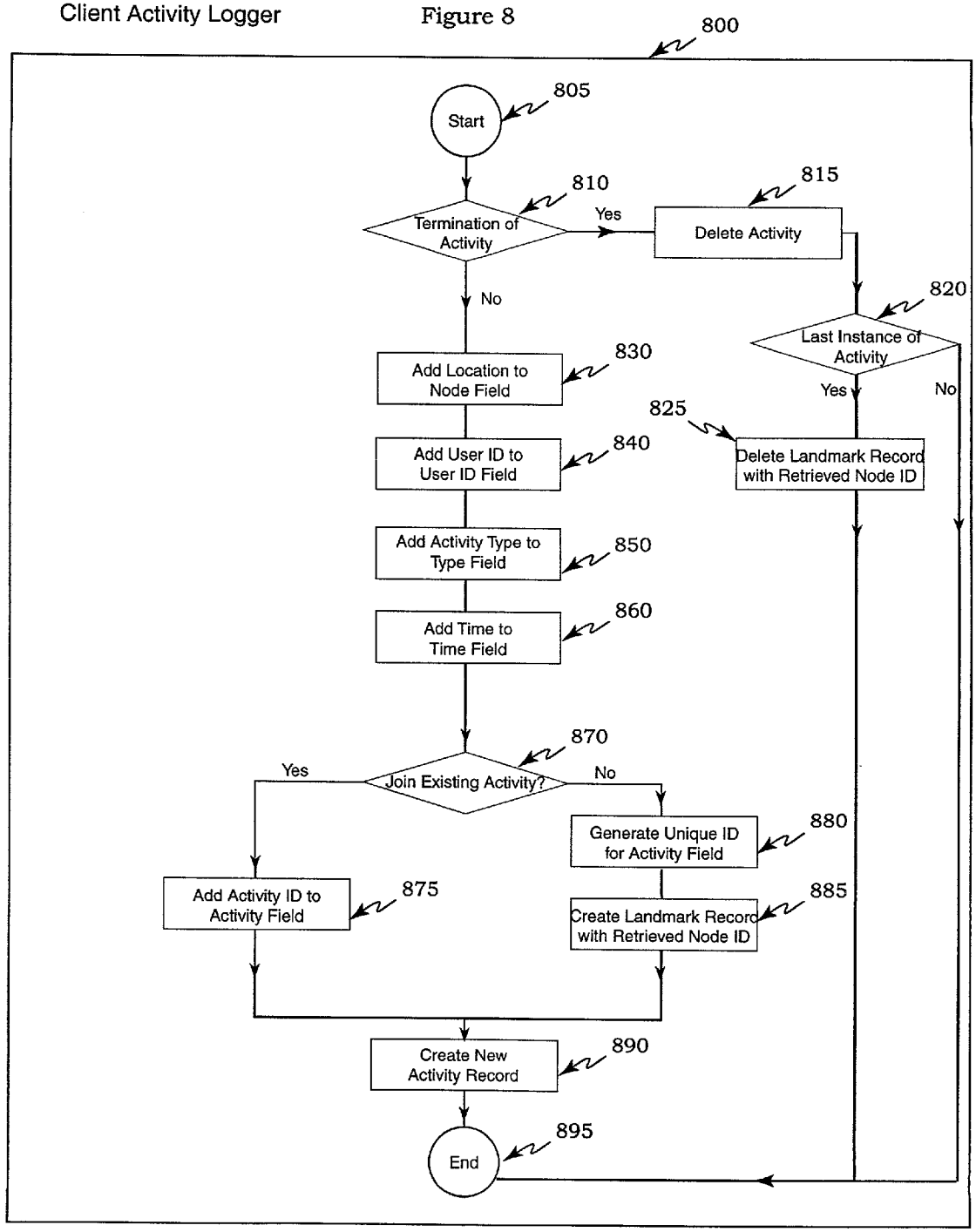
FIG. 8 is flow chart of a client activity logger process.

FIG. 8 illustrates how the Client Activity Logger (800) processes the client activity log requests (540). This process either deletes or creates an instance of the Activity Data Structure (2900), and possibly creates or deletes an instance of the Landmark Data Structure (2700). If the request is to terminate an activity (e.g., chat) (810), the relevant instance of the Activity Data Structure (2900) is deleted (815). If this activity is the last instance (820), then the instance of the Landmark Data Structure (2700) for this activity at this node is deleted (825). The process then terminates (895). Otherwise if the original request is not to terminate the activity, an instance of the Activity Data Structure (2900) is created through a process that retrieves from the client, the Location for the Node Field (830), the User ID for the User ID Field (840), the Activity Type for the Type Field (850), the Time for the Time Field (860). If this activity request is to join (870), then the Activity ID is added to the Activity Field (875). Otherwise, a new unique Activity ID is generated and added to the Activity Field (880) and a new instance of the Landmark Data Structure (2600) for the particular activity at the particular Node is created (885). The resulting instance of the Activity Data Structure is added to the database (890) and the process then terminates (895).

Figure 9:
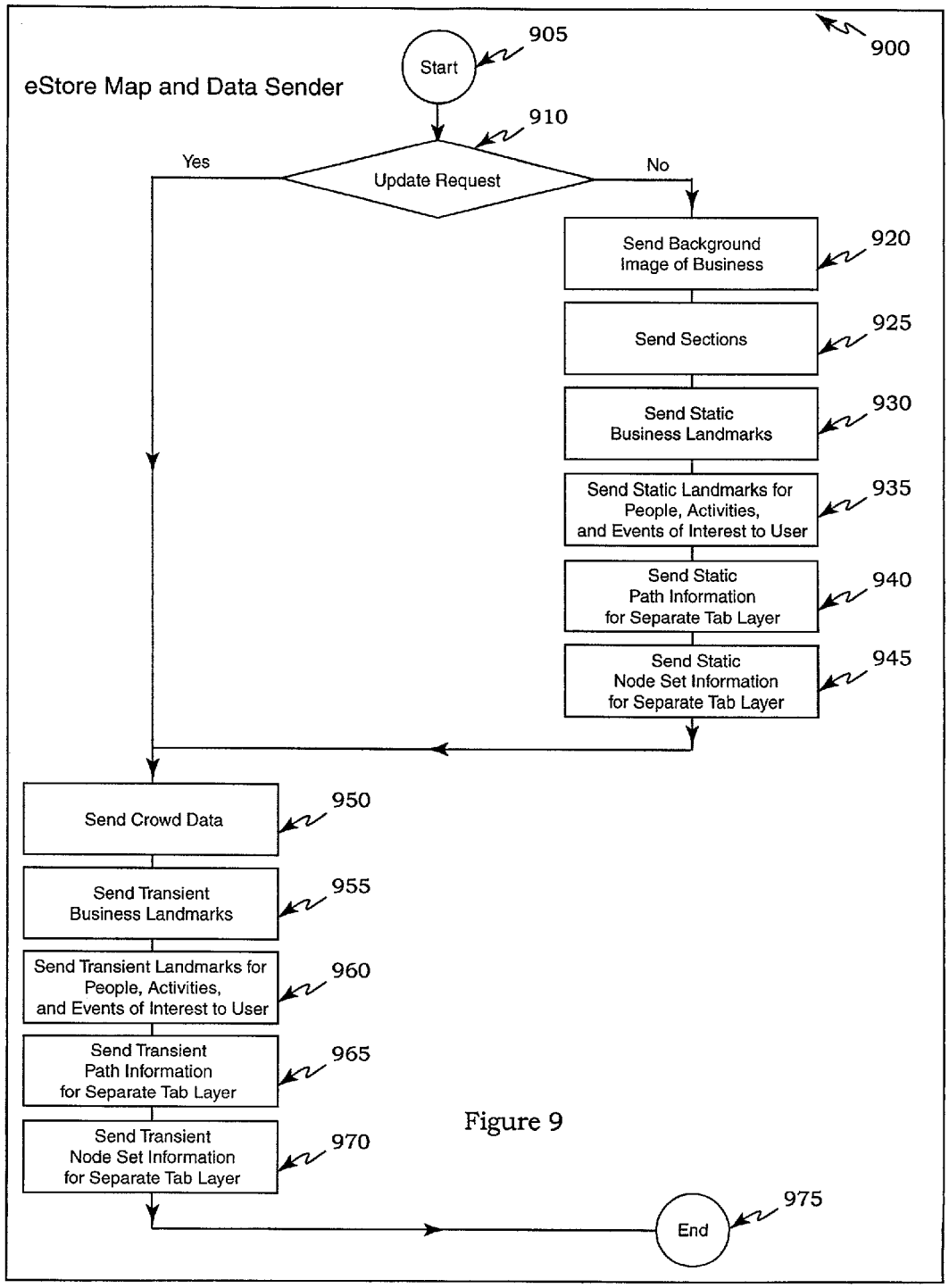
FIG. 9 is a flow chart of an eStore map an data sender process.

FIG. 9 illustrates how the eStore Map and Data Sender (900) processes the eStore map requests (550). This process responds to a client requesting information that will enable the client to create or update the eStore Map. If the request is not an update request (910), the process must provide additional information. This includes sending the background image of the business (920), the data for drawing the sections (925), the data about the static business landmarks (930), the data about the static landmarks for people, activities and events of interest to the user (935), the static path data of interest to the user (940), and the static node set data of interest to the user (945). All requests handled by this process would send along the crowd data (950), the data for the transient business landmarks (955), the data for the transient landmarks for people, activities, and events of interest to the user (960), the transient path data of interest to the user (965), and the transient node set data of interest to the user (970).

Figure 10:
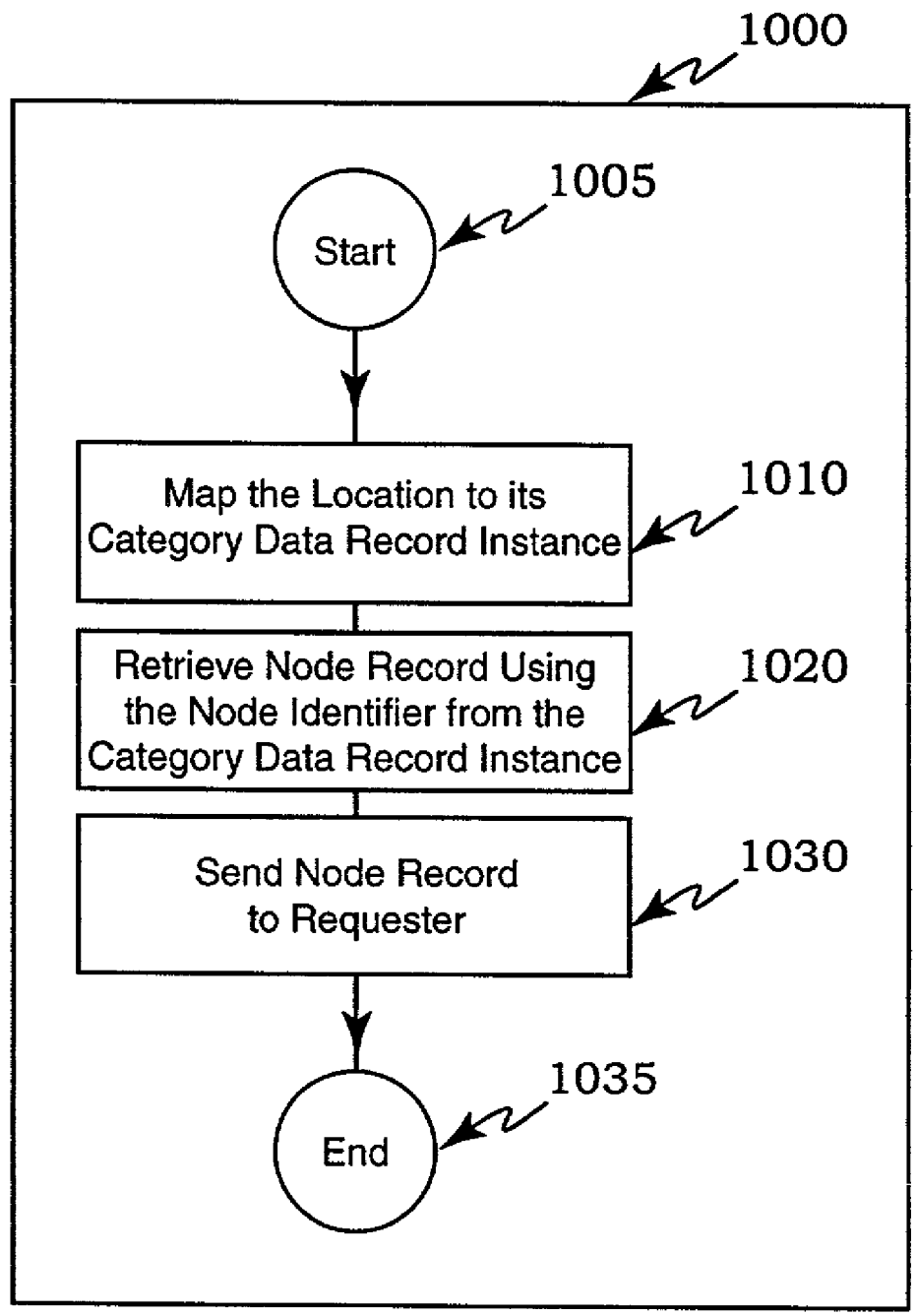
FIG. 10 is a flow chart of an eStore location mapper process.

FIG. 10 illustrates how the eStore Location Mapper (1000) processes the eStore location map requests (560). This process responds to a client requesting the Node information for an associated Web page. The process maps (1010) the Web page to its Category Data Structure instance. The Node Identifier from this instance is used to retrieve (1020) the corresponding instance of the Node Data Structure. Both pieces of information for this Node record instance are forwarded (1030) to the client.

Figure 11:
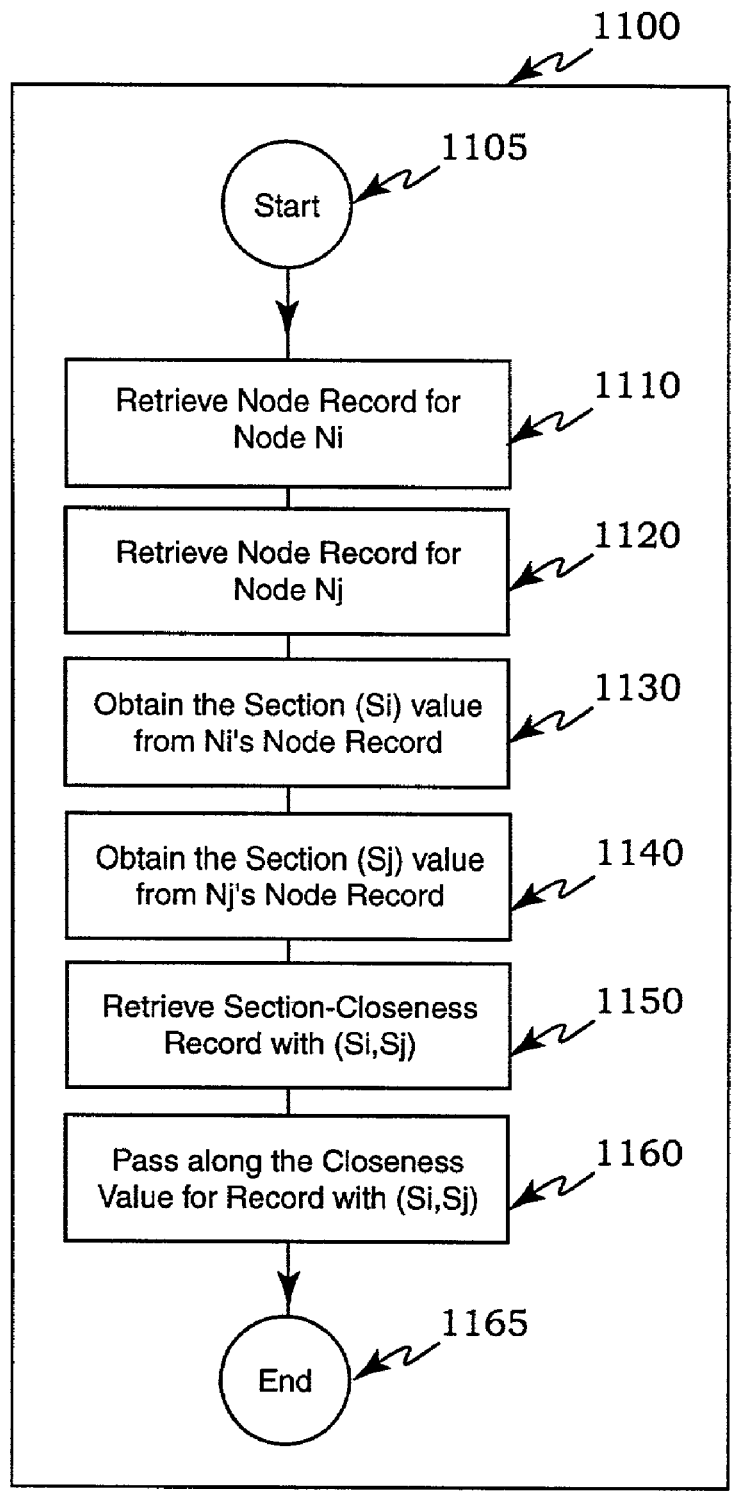
FIG. 11 is a flow chart of a closeness retriever process.

FIG. 11 illustrates how the Closeness Retriever (1100) processes the closeness requests (570). Given two Web page locations represented as Ni and Nj, the process retrieves the instance of the Node Data Structure for Ni (1110) and Nj (1120). From the corresponding Node instance, the process retrieves the Section identifier for Ni (1130) and Nj (1140); known as Si and Sj respectively. Using the retrieved Section identifiers, the process retrieves (1150) the instance of the Section Closeness Structure containing Si and Sj. The process (1160) returns the Section Closeness record. Closeness between pie segments or between two node locations can be exploited to convey information about the relationship between the items. Specifically, related categories (i.e., pie segments) are placed in close proximity to each other and related Web pages are clustered in a district. Proximity is important for enabling site participants to make use of semantic similarity to establish common ground with other participants. Also, the spatial representation of the semantic structure of Web pages contributes to rooting in a semantic context a person's location and her activities. The relationships that are expressed in the category structure enable the visitor to draw certain inferences about relationships amongst the users of those categories. Thus it makes available a semantic component which has been shown to be important for helping people to establish common ground. The site-map is intended to be the basis of a sharable representation, in time; much like city maps are.

Figure 12:
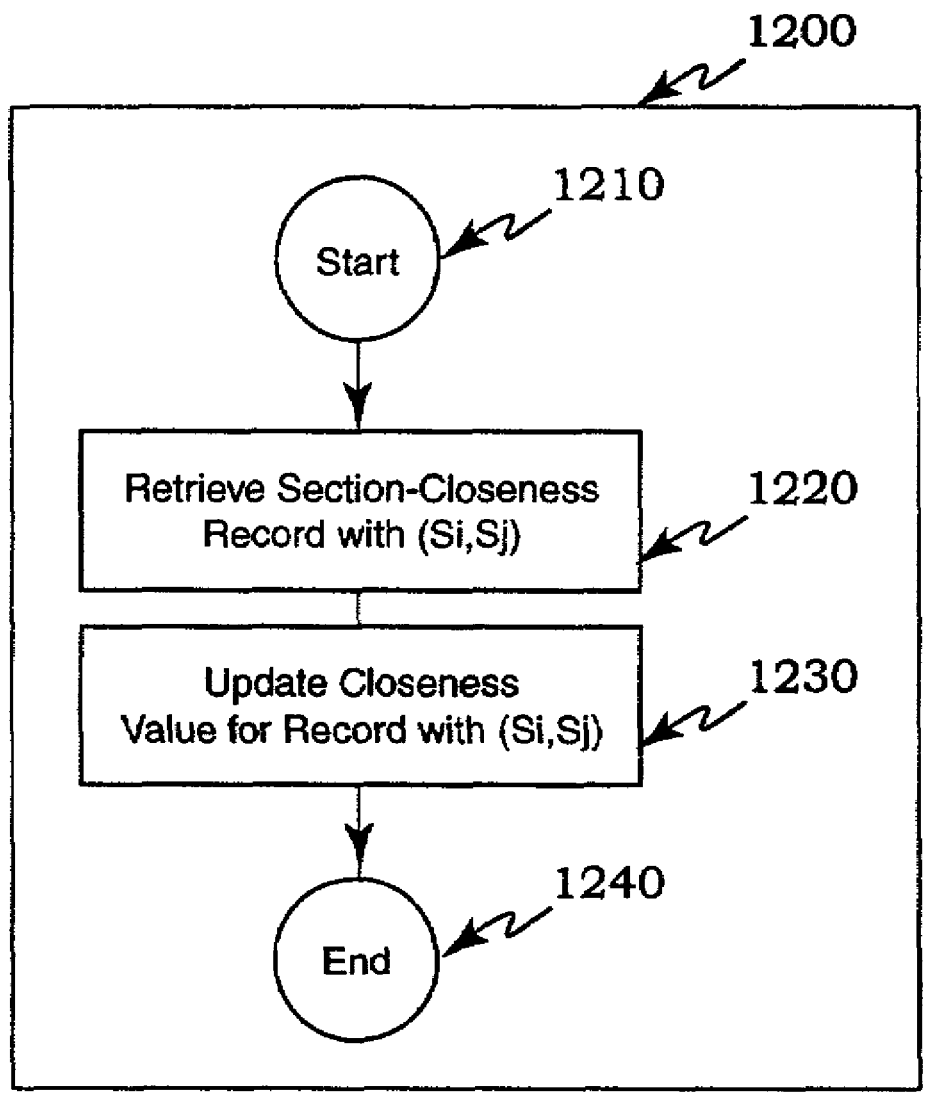
FIG. 12 is a flow chart of a closeness updater.

FIG. 12 is a flow chart of a Closeness Updater (1200) process that responds to periodic requests (580) to update the closeness value for two sections, represented as Si and Sj. It retrieves (1220) the instance of the relevant Section Closeness Data Structure (2500) instances represented by Si and Sj. Its closeness value is updated (1230). In the example of semantic distance as a measure of closeness, the periodic updates occur when new catalog items are added/removed from a section. A re-computation of the closeness measure between this section and every other section in the eStore will result in updates to the relevant instances where the closeness values for (Si, Sj) are changed. In the example based on probability of moving from one section to another, the periodic updates may be recomputed hourly or daily, for example, based on the browsing behavior of people over the hour or day.

Figure 13:
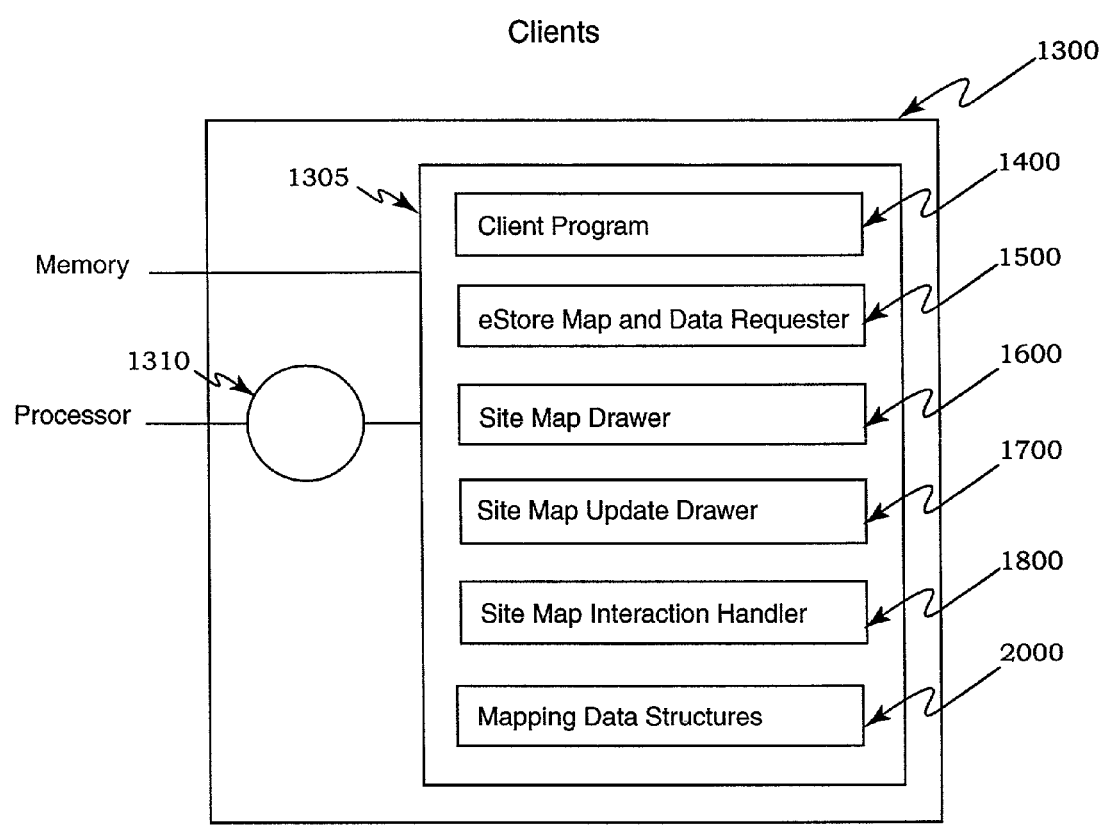
FIG. 13 is a client architecture.

FIG. 13 shows a block diagram of the major components of the Clients (1300) that transmit user data and requests to the ePlace Server (400) and eStore Server (200), to process received data, and to provide a graphic rendering of the processed data provided by the current invention. The ePlace Client (1300) preferably includes a Processor (1310) and memory (1305) such as RAM. According to an embodiment of the present invention, the Client Program (1400) (described in detail with reference to FIG. 14) is used to operate the client and is preferably embodied as computer executable code that is loaded remotely over the network (100) into memory (1305) for execution by Processor (1310). The memory (1305) preferably includes the Client Program (1400) (described in detail with reference to FIG. 14), the eStore Map and Data Requester (1500) (described in detail with reference to FIG. 15), the Site Map Drawer (1600) (described in detail with reference to FIG. 16), the Site Map Update Drawer (1700) (described in detail with reference to FIG. 17), the Site Map Interaction Handler (1800) (described in detail with reference to FIG. 18), and the Mapping Data Structures (2000) (described in detail with reference to FIG. 2).

Figure 14:
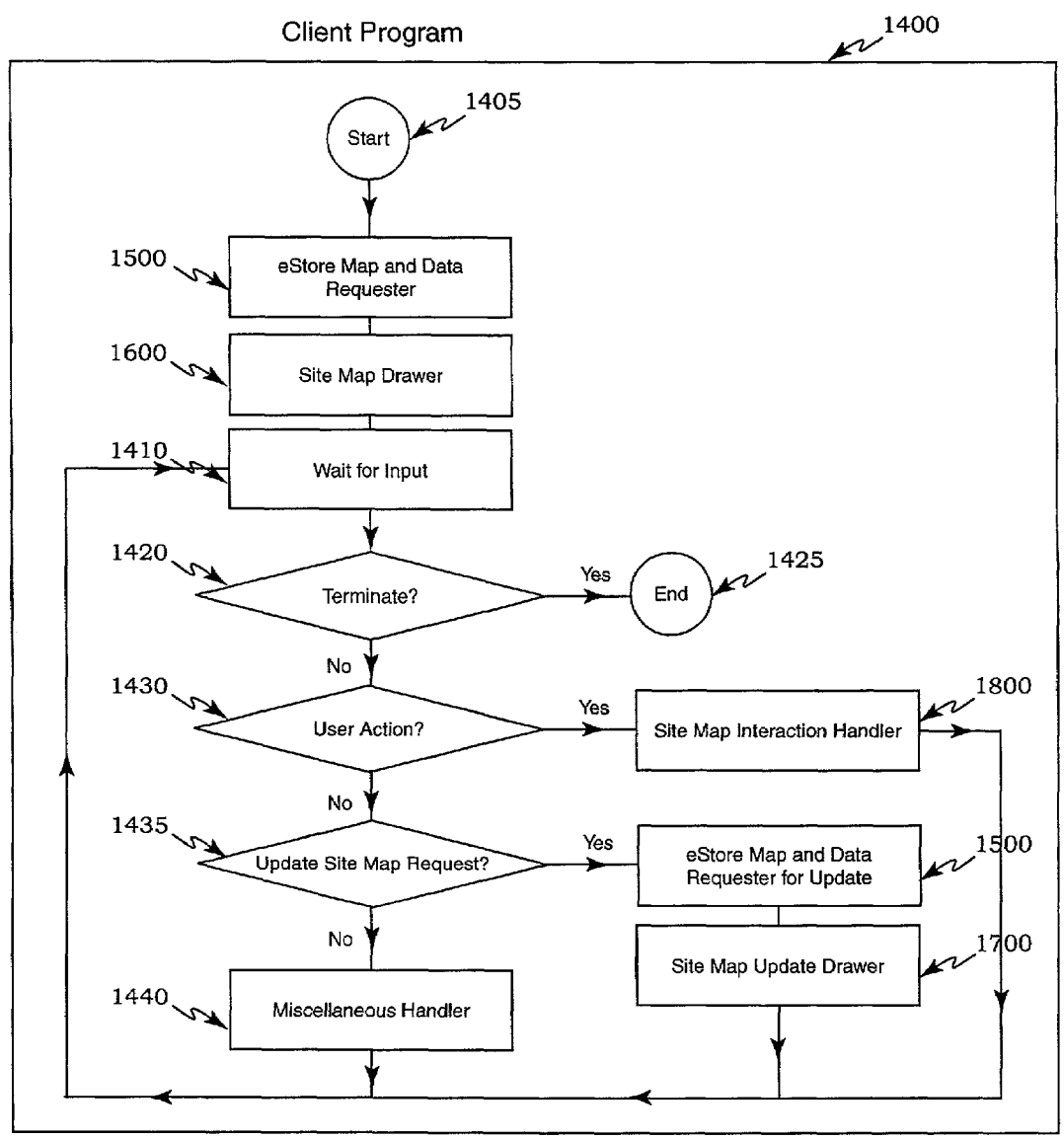
FIG. 14 a flow chart of a client process for updating changes from one or more ePlace servers and/or internal queries.

FIG. 14 provides the client program logic and flow view of the Client (1300) invoking each of the program elements resident in memory (1305). The Client program starts up (1405) by requesting the eStore Map and Data (1500), invoking the Site Map Drawer (1600) to draw the eStore Map (FIG. 3A) and then sitting in a loop waiting for input (1410) from its own client processes or ePlace Server (200). An input request to terminate (1420) will end the client program (1425). A request to process a user action (1430) will invoke the Site Map Interaction Handler (1800). A request to Update the Site Map (1435) will invoke the eStore Map and Data Requester for Update (1500) to obtain updates to its local information about the eStore map followed by an invocation of the Site Map Update Drawer (1700) to update the visual representation of the map. Otherwise, a miscellaneous handler is invoked (1440). On return from processing each of these input requests, control returns to the handler awaiting for further input (1420).

Figure 15:
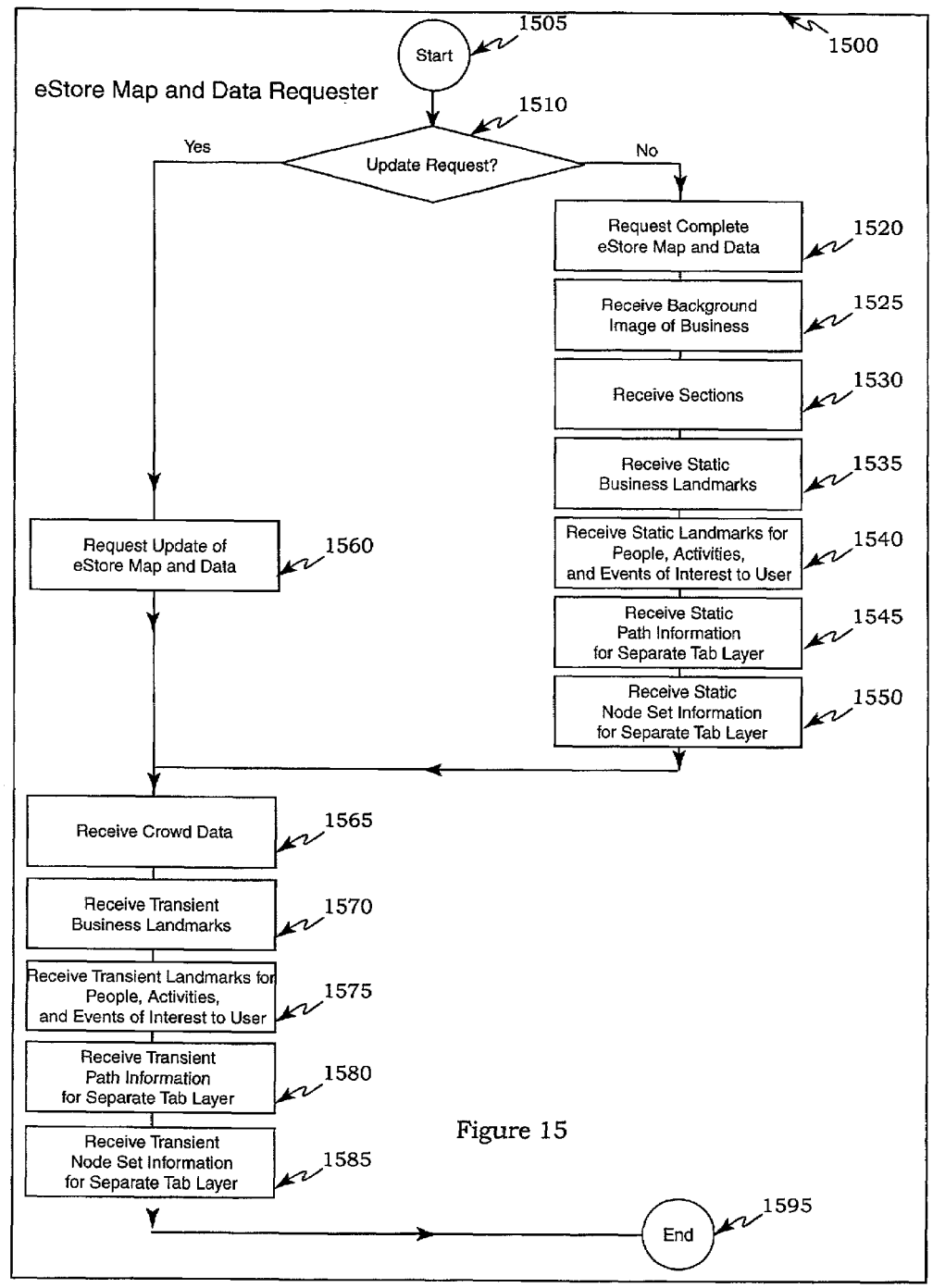
FIG. 15 is a flow chart of eStore map and data requester process.

FIG. 15 illustrates the program flow and logic of the handler for the eStore Map and Data Requester (1500). If the request is not an update request (1510), the process must perform additional operations. They include requesting a complete set of data for the eStore map (1520) from the ePlace Server (900) and processing the response to the request by receiving the Background image of Business (1525), data for Sections (1530), static business landmarks data (1535), static landmarks data for people, activities, and events of interest to the user (1540), the static path information of interest to the user (1545), static node set information of interest to the user (1550), the crowd data (1565), transient business landmarks data (1570), transient landmarks data for people, activities, and events of interest to the user (1575), transient path information of interest to the user (1580), and transient node set information of interest to the user (1585). If the request is an update request, the process simply Requests Update of eStore Map and Data (1560) from the eStore Server (900). This results in the receipt of the crowd data (1565), transient business landmarks data (1570), transient landmarks data for people, activities, and events of interest to the user (1575), transient path information of interest to the user (1580), and transient node set information of interest to the user (1585). The handler (1595) returns the information obtained from each branch of the handler.

The site map displays people's presence, activities, and interactions within the same representation used to locate the Web pages. The presence and location of all the visitors to the Web site is rendered using crowd landmarks. Specifically, the number of individuals located collectively at the same Web page location is determined by the system and the crowd landmark represents the density using dots with different intensities or a cloud pattern with different opacity. Visitors and buddies appear as people landmarks designated by colored circles located at the Web page which they are viewing. Users identify, through a user preference, which people they want to be notified about. A business may also use such people landmarks for their own representatives like a customer support person. Landmarks around the perimeter of the semi-circle represent major categories of the semantic structure which remain permanently visible. Other services that do not have a hierarchical structure can be represented outside of the semi-circular area. Temporal activities and events occurring at the site, like featured auctions or the Web page with the most visitors at the present time, are represented by transient landmarks. Finally, social interactions like a chat between a service agent and a customer are represented by a different landmark with a different. Past actions and interactions are represented using paths. For example, paths are used to represent a user's own traversals as well as the well-trodden paths of a group of users. This information is overlaid on top of the user's site map.

The site-map representation should enable a user to explore his environment. A tool-tip-like function allows users to roll-over the landmark to obtain additional information. For example, positioning the cursor over the CSR landmark reveals that the CSR is in conversation with another customer and two other customers are waiting to talk to the CSR. Clicking on a non-crowd landmark transports the user to the Web page designated by the landmark. This example also demonstrates how the site-map visualization enables visitors to a Web site to identify other participants in the context of their activities. By rooting individuals in a context of their activity on the site, the representation establishes an incipient common ground that may be leveraged by visitors to begin a conversation. This is crucial for motivating interaction between people who probably do not know each other. In addition to the tool-tip functionality, users can make various parts of the representation visible. They may show or hide additional details like the category labels for a pie segment. These features allow the user to control the complexity of the representation.

Figure 16:
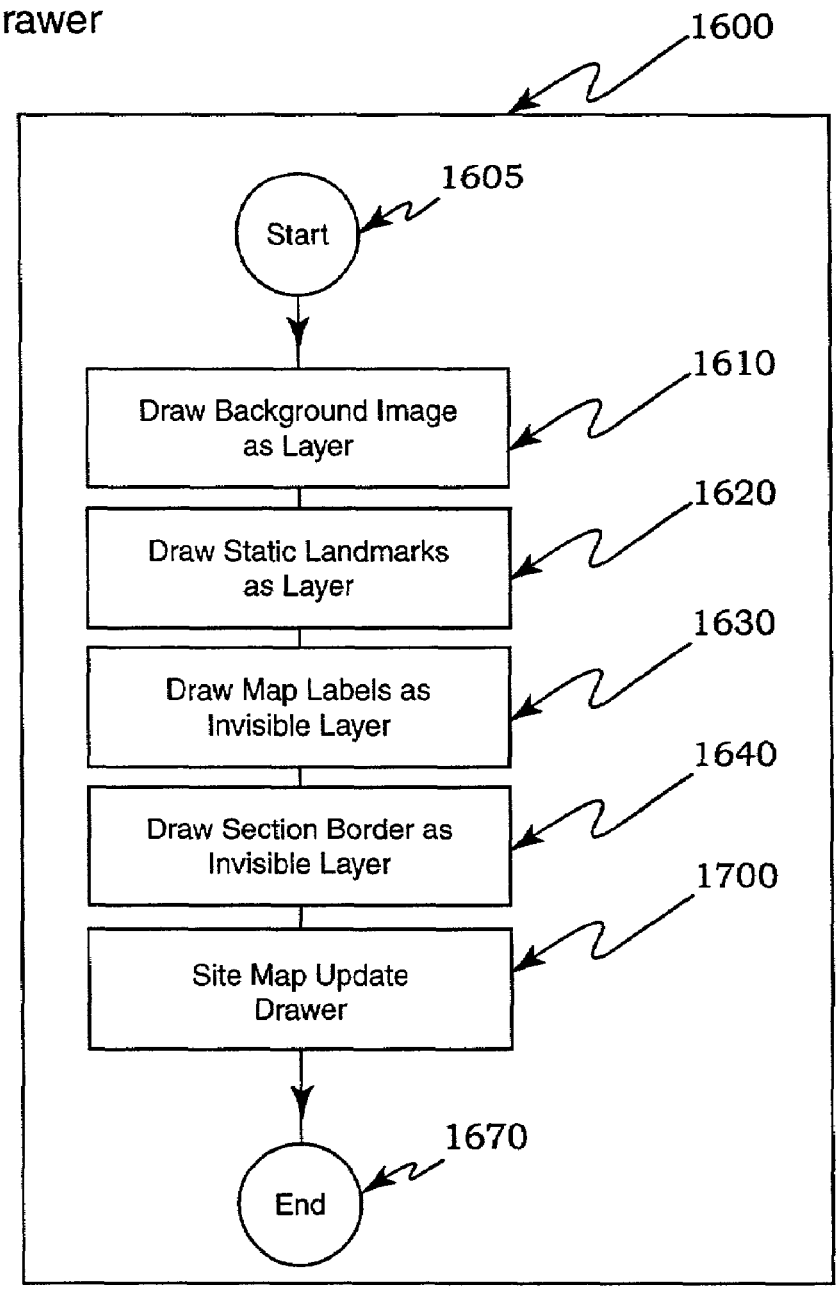
FIG. 16 is a flow chart of a site map drawer process.

FIG. 16 illustrates the program flow and logic of the handler for the Site Map Drawer (1600) that draws all the layers of the eStore Map (FIG. 3A-3C). It begins by drawing a visible layer containing the background image (1610) and another visible layer containing all the static landmarks (1620). Next, it draws the Map Labels (1630) and Section Borders (1640) in separate invisible layers. Then, it invokes the handler for Site Map Update Drawer (1700) to draw the rest of the layers of the eStore Map.

Figure 17:
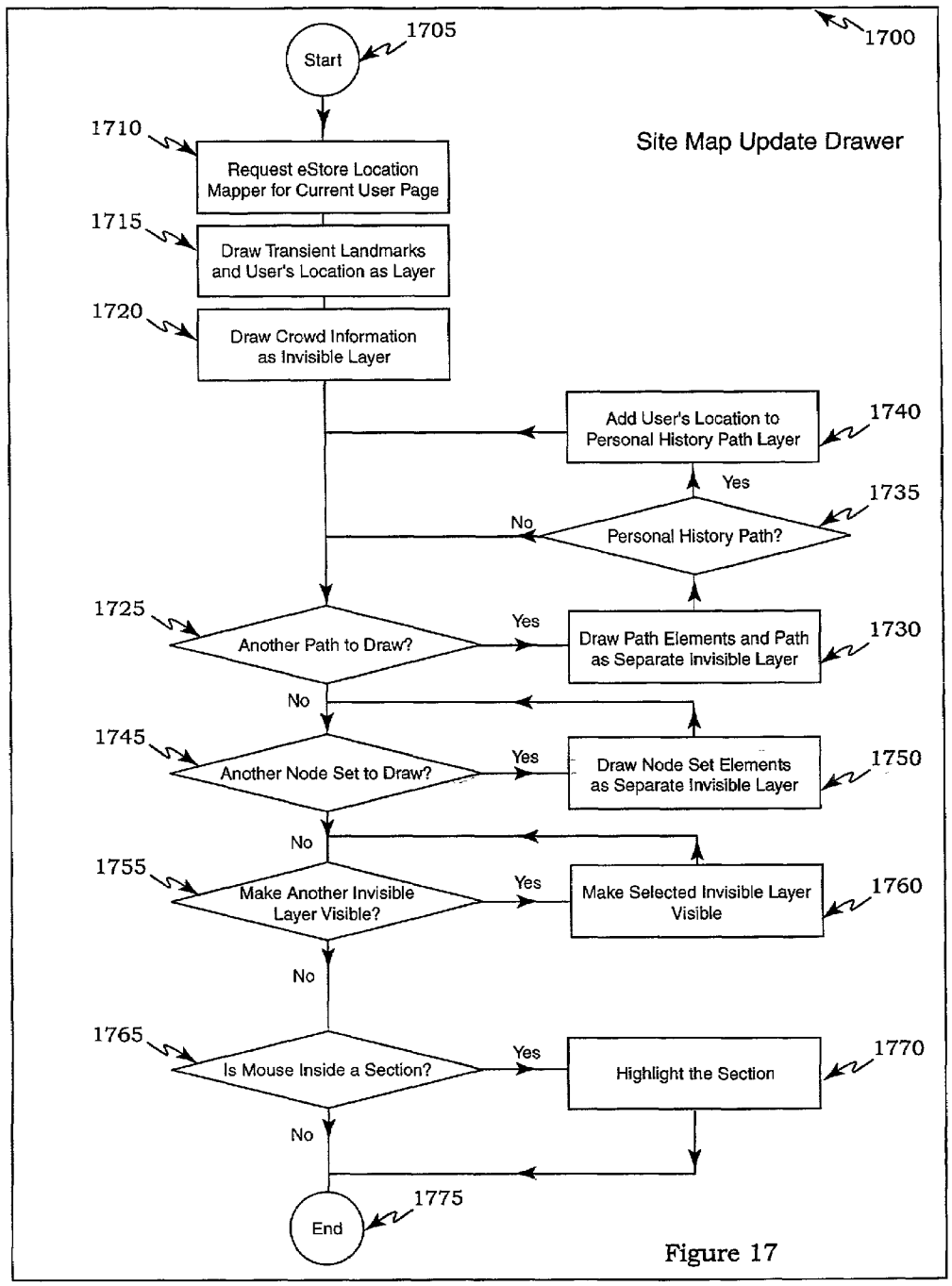
FIG. 17 is a flow chart of a site map update drawer.

FIG. 17 illustrates the program flow and logic of the handler for the Site Map Update Drawer (1700) that draws selected layer of the eStore Map (FIGS. 3A-3C) and makes the user-selected layers visible. It begins by requesting the ePlace Server (400) to obtain the Node information for the user's Web page location (1710). Then, it draws all the transient landmarks and the user's location as a separate layer (1715). The crowd information is drawn on a separate layer (1720). For each set of path information (1725), the path elements and path are drawn in a separate invisible layer (1730). If the current path is the Personal History Path (1735), the user's location is drawn into the same invisible layer (1740). After the paths are drawn, then for each node set (1745), the node set elements are drawn in a separate invisible layer (1750). Next, for each invisible layer that the user opted to make visible (1755), they are made visible (1760). Finally, if the user's current mouse pointer is inside a section (1765), the section is highlighted (1770).

Users can initiate synchronous interactions with other users by selecting the desired interaction from an interaction menu which is brought up by right-clicking over a landmark icon for a person. A context-sensitive interaction menu lists the relevant interactions appropriate for the selected landmark. For example, a user right clicks on a landmark representing a customer service agent and selecting the 'Speak to CSR' menu option to get in line to talk to the agent. Another scenario of a possible social interaction is a user who decides to participate in an ongoing auction or other structured commerce transactions and does so by right-clicking over the transaction landmark to initiate the function. Asynchronous interaction is an important component of the site-map because it enables a user to explore what has happened at a site earlier and use this to guide his own actions. Users may look for and follow the well-trodden path which exists from any place they visited. This path is the common path taken by others that began based on similar steps taken by the user. This form of asynchronous interaction exploits social navigation; navigation guided by behaviors of others. Once the paths or footprints are visible, the user may examine footprints or well-trodden paths from any of its nodes. The user can use the tool tip function over any of the footprints and paths to obtain additional information. For example, a user can examine the makeup of groups of people for a particular footprint.

Figure 18:
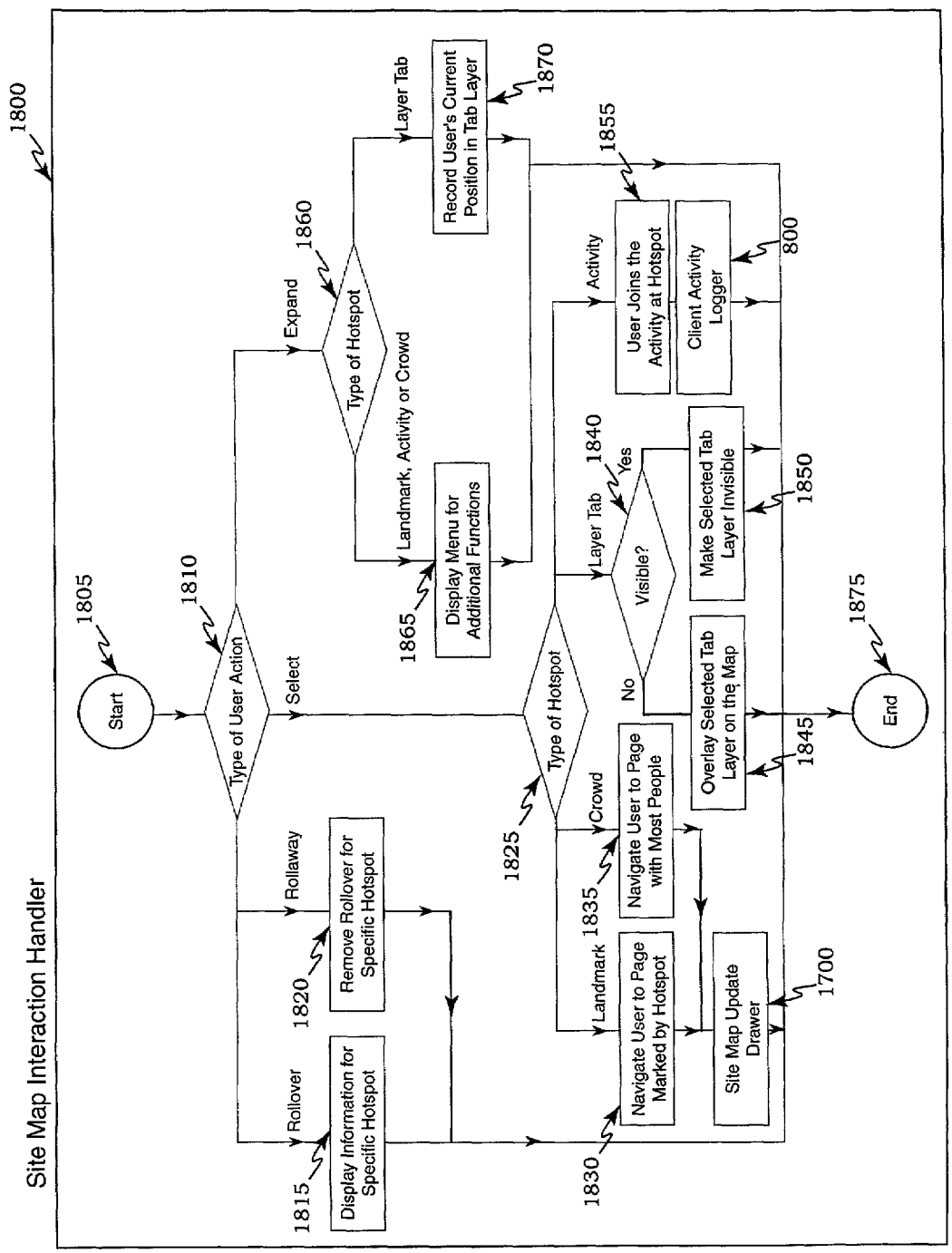
FIG. 18 is a flow chart of a site map interaction handler.

FIG. 18 illustrates the program flow and logic for the Site Map Interaction Handler (1800) that processes all user action requests. If the user action is a Rollover (user's cursor is over a hotspot item) then the process displays information for the specific hotspot (1815) and terminates (1875). If the user action is a Rollaway (user's cursor moves away from a hotspot item) then the process removes the displayed information for the specific hotspot (1820) and terminates (1875). If the user action is Select (user left-clicks on a hotspot item) then the process must determine what type of a hotspot it is (1825). If the hotspot is a Landmark, the process navigates the user to the Web page marked by the hotspot (1830), invokes the site map update drawer (1700) to draw the user's new location, and terminates (1875). If the hotspot is a Crowd, the process navigates the user to the Web page with the most people (1835), invokes the site map update drawer (1700) to draw the user's new location, and terminates (1875). If the hotspot is a Layer Tab (3320), the process determines if the layer is visible (1840). If the layer is not visible, the process overlays the selected tab layer on the map (1845) and terminates (1875). Otherwise, if the layer is visible, the process makes the selected tab layer invisible (1850), and terminates (1875). If the Select user action is over an Activity hotspot, the process enables the user to join the activity marked by the hotspot (1855), requests logging of the activity (800), and terminates (1875). If the user action is to Expand (user right-clicks on a hotspot item), then the process must determine what type of a hotspot it is (1860). If the hotspot is a Landmark, Activity or Crowd item, the process displays a menu with additional functions (1865), waits for the function selection, invokes the function and terminates (1875). Otherwise, if the hotspot is a Layer Tab, the process records the user's current position in Tab Layer (1870) and terminates (1875).

A number of non limiting examples are provided to illustrate the type of interactions that the objects of this invention could support.

While visiting a retail commerce site, a user is made aware of a buddy's appearance on the ePlace site-map. The user moves to the buddy's location by clicking on the buddy's iconic representation. There, the user engages the buddy in a private chat to seek out the buddy's opinion about an item. They decide to check the item out together. So, the user brings up a trace of her browsing history to find where the item is located and moves to its location. Shortly, the buddy appears there as well, having followed the user by clicking on the user's iconic representation on his ePlace site-map.

While browsing an investment site for the first time, the user wants to find out where people go from her present location. She interacts with the ePlace site-map to call up the well-trodden footprints leading from her current location. These appear and the user examines the various footprints to determine the group characteristics of the people making the footprint. She disregards several of them on the basis that they are steps taken by people that are unlike her but identifies two that are potential candidates because of her similarity to the people who made the footprints. The user decides to follow those footprints to see what they lead to.

While visiting a marketplace, the user is notified that several of her buddies are currently at the site. She checks out their iconic representation to determine who they are and how long they have been at the site. She notices that one of them has a very different iconic representation. On closer examination, she learns that this person is in a chat with her other buddy. The user decides to join in on the personal chat.

While at an auction marketplace, the user queries the site-map system to determine the most popular seller of portables. In answer to the query, the ePlace site-map marks the seller's home page location on the site map. The user then inquires about the auctions being conducted by this seller. The location of these auctions are added to the site map.

While visiting an auction marketplace, the user becomes aware of where people are congregating at the site by dots of different densities. Occasionally, a transient marker appears indicating the location where the largest crowd of people are. In previous visits to the site, the user also marked auction items that she was interested in or bid on. She can view these marked locations and can monitor the amount of interest in those auctions. She also kept a contact list of particular sellers that she deals with. While currently visiting the site, the user is notified that one particular seller she wanted to talk with is present at the site. She contacts the seller to follow up on a question that she had about one of his auction items and they both move to the auction in question to discuss her question.

While at a retail commerce site, the user needs to consult a customer service representative. From the site-map, she sees that several agents are scattered at various locations at the marketplace. The user picks the agent located in the same section as she is. However, on examining the queue, she notices that there are three people ahead of her with an estimated wait time of 5 minutes. She examines the availability of an agent in the general information area and determines that the agent is not busy with any customers. The user decides that her inquiry is general enough so that an agent located in the general information area could assist.

The scenarios suggest a variety of social information, queries and explorations of interest to ePlace users, including emerging social patterns of activities and events occurring at a marketplace. For example, The people that make up a user's contact list. They may be a person's buddies, people that they have interacted with before, and people of interest to them who they may not have directly interacted with.

The dispersion of people at a site, people's location, and the centers of attraction indicated either by gatherings of people or activity hotspots (e.g., hot auction).

The types of visitor groups at a marketplace (e.g., the makeup of the group for a particular footprint) and where they visited. Groups may be similar, complementary, or very different from the user.

The locations of individuals and groups are correlated with the semantic context and functionality of the marketplace (e.g., the agents' location provide information about which agents can assist the user).

The transient activities (e.g., the location with the largest crowd) and the periods of high and low activity at the Web site or in particular areas of the Web site.

The ongoing interactions (e.g., three people are ahead of the user in the queue to talk to a particular agent with an estimated wait time of 5 minutes).

The activities and interactions of particular people or groups (e.g., the most popular seller from a group of sellers of portables) and their availability state.

Finally, the scenarios illustrate interactions that are not limited to people that a user knows, but also includes strangers like customer service agents or people they have had no prior interactions with. Interactions are started with people who are close by or in areas suggestive of common interest or relevance to the user's current needs. They do not need to involve direct interactions with other people. Also, they can involve interactions with artifacts left by earlier users (e.g., footprints). The scenarios suggest that peripheral activities or interactions occurring at the site may be brought to bear to assist the user's own tasks.

We claim:

1. A method for providing navigational information for facilitating navigation and user socialization at web sites, the method being utilized in a computer networking system having one or more central processing units, one or more memories, and one or more network connections, the method comprising steps of:

creating at least one instance of a mapping data structure for a web site, the created mapping data structure representing two or more categories, each of the two or more categories divided into subcategories of ordered levels of specificity, each of the ordered levels of specificity being a grouping of subcategories of the same levels of specificity;

generating a graphical representation of said at least one instance of said mapping data structure, said generated graphical representation graphically depicting each of the two or more categories and its subcategories mapped to a corresponding pie segment, wherein the subcategories of each of the two or more categories are separated by subrings;

mapping information about people, activities, and social interactions at the web site onto a plurality of icons in said graphical representation;

selecting one of the plurality of icons by a user; and returning additional information of people, activities or social interactions corresponding to the selected one of the plurality of icons, wherein the returned additional information comprises information facilitating socialization between the user with people, activities or social interactions corresponding to the selected one of the plurality of icons.

2. A method as in claim 1, wherein said mapping data structure includes one or more sections, the sections being logical intersections of one of the two or more categories with one of the levels of specificity.

3. A method, as in claim 2, wherein one or more subcategories have a degree of closeness relating the section to one or more other sections.

4. A method, as in claim 3, wherein the degree of closeness relates to any one or more of following: a physical closeness of location of physical items represented by the respective sections, a relational closeness between one or more users and one or more objects, a relational closeness between one or more users, a semantic closeness of descriptions of items represented by the respective sections, and a behavioral closeness of pattern of use.

5. A method, as in claim 1, wherein the categories include any one or more of the following: a product category, a service category, a category class, a category list, a product class, a list of products in a class, a product specification, a service class, a list of services, and a service specification.

6. A method, as in claim 1, wherein the levels of specificity include any one or more of the following: category class, category list, offering specification, product class, list of products in a class, product specification, service class, list of services, and a service specification.

7. A method, as in claim 1, further comprising a step of collecting information about one or more nodes located on one or more districts.

8. A method, as in claim 7, wherein the one or more nodes are differentiated by one or more node functions.

9. A method, as in claim 8, wherein the node functions include any one or more of the following: initiating a chat session, providing information, causing a user to be associated with a node location, providing access to sales information, providing access to a salesman, and changing a browser page to one that has information relating to the node.

10. A method, as in claim 7, wherein one or more of the nodes is a landmark that marks a salient location on one or more of the districts.

11. A method, as in claim 10, wherein the salient location is fixed and associated with one of a plurality of business categories.

12. A method, as in claim 10, wherein the salient location can change in time and is associated with an activity.

13. A method, as in claim 12, wherein the activity is any one or more of the following: a current "hot spot", "a list of most popular pages in a computer section", a public chat, a sale, a special product offering, a special service offering, and a sales agent availability.

14. A method, as in claim 10, wherein the salient location is personally meaningful to a user.

15. A method, as in claim 14, wherein the salient location represents any one or more of the following: a user's buddy, a chat buddy, a private chat, a user's favorite spot, and a user with common interest.

16. A method, as in claim 7, further comprising a step of generating one or more paths, each path connecting two or more nodes.

17. A method, as in claim 16, wherein the path links two or more of the nodes to associate connectivity relationships among the nodes.

18. A method, as in claim 16, wherein a path is associated with one of the following: a user's path through one or more of the districts, a customer's path through one or more of the districts, a preferred path of a group of users through one or more of the districts, a preferred path of a group of users with common interests through one or more of the districts, and a preferred path of a group of users with complementary interests through one or more of the districts.

19. A method, as in claim 7, further comprising a step of grouping said one or more nodes into one or more node sets, each node set containing one or more nodes clustered in nearby locations in one or more of the districts.

20. A method, as in claim 19, wherein a node set represents a relationship among two or more nodes located in one or more of the districts.

21. A method, as in claim 19, wherein one or more of the node sets is associated with one of the following: a density of users gathered in one or more adjacent node locations, a set of node locations marking results of a search, a set of node locations related by a semantic attribute, a set of node locations visited by a group of users with common interests, a set of node locations visited by a group of users with complementary interests, and a crowd of users.

22. A method, as in claim 19, wherein one or more of the node sets has a node set function.

23. A method, as in claim 22, wherein the node set function includes any one or more of the following: providing information about the set, changing a user's location to be associated with a node location in the set, and changing a browser page to one that has information relating to a node in the set.

24. A method, as in claim 1, where the instance of the mapping data structure is served over one or more of the network connections for display of one or more visual districts on one or more clients.

25. A computer storage medium product for storing a computer program comprising the steps of:

creating an instance of a mapping data structure for a given web site, the created mapping data structure representing two or more categories by dividing each of the two or more categories into subcategories of ordered levels of specificity;

dividing each of the ordered levels of specificity into a grouping of subcategories of the same levels of specificity;

displaying the subcategories and the grouping of subcategories by level of specificity in a geometric pattern such that the subcategories are defined by subrings and are graphically depicted within a corresponding category mapped to a corresponding pie segment;

mapping information about people, activities, and social interactions at the web site onto a plurality of icons in said geometric pattern;

selecting one of the plurality of icons by a user; and returning additional information of people, activities or social interactions corresponding to the selected one of the plurality of icons, wherein the returned additional information comprises information facilitating socialization between the user with people, activities or social interactions corresponding to the selected one of the plurality of icons.

26. A computer system having a processor for implementing an application program, comprising:

means for creating an instance of a mapping data structure for a given web site, the created mapping data structure representing two or more categories by dividing each of the two or more categories into subcategories of ordered levels of specificity;

means for dividing each of the ordered levels of specificity into a grouping of subcategories of the same levels of specificity;

means for displaying the subcategories and the grouping of subcategories by level of specificity in a geometric pattern such that the subcategories are defined by subrings and are graphically depicted within a corresponding category mapped to a corresponding pie segment;

means for mapping information about people, activities, and social interactions at the web site onto a plurality of icons in said geometric pattern;

selecting one of the plurality of icons by a user; and returning additional information of people, activities or social interactions corresponding to the selected one of the plurality of icons, wherein the returned additional information comprises information facilitating socialization between the user with people, activities or social interactions corresponding to the selected one of the plurality of icons.

* * * * *